US009716540B2

(12) United States Patent
Nagata et al.

(10) Patent No.: US 9,716,540 B2
(45) Date of Patent: Jul. 25, 2017

(54) USER TERMINAL, RADIO COMMUNICATION SYSTEM, RADIO COMMUNICATION METHOD AND RADIO BASE STATION

(71) Applicant: NTT DOCOMO, INC., Tokyo (JP)

(72) Inventors: Satoshi Nagata, Tokyo (JP); Jing Wang, Beijing (CN); Xiang Yun, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/410,973

(22) PCT Filed: Jun. 24, 2013

(86) PCT No.: PCT/JP2013/067237
§ 371 (c)(1),
(2) Date: Dec. 23, 2014

(87) PCT Pub. No.: WO2014/002943
PCT Pub. Date: Jan. 3, 2014

(65) Prior Publication Data
US 2015/0215022 A1 Jul. 30, 2015

(30) Foreign Application Priority Data
Jun. 26, 2012 (JP) ................. 2012-143456

(51) Int. Cl.
*H04L 1/00* (2006.01)
*H04B 7/06* (2006.01)
(Continued)

(52) U.S. Cl.
CPC ........... *H04B 7/0626* (2013.01); *H04L 5/001* (2013.01); *H04L 5/0035* (2013.01);
(Continued)

(58) Field of Classification Search
CPC ..... H04W 72/04; H04W 72/05; H04W 72/06; H04W 80/04; H04W 80/05; H04W 80/06; H04W 80/07; H04W 80/08
(Continued)

(56) References Cited

U.S. PATENT DOCUMENTS

| | | | |
|---|---|---|---|
| 2011/0199986 A1 | 8/2011 | Fong et al. | |
| 2012/0287875 A1* | 11/2012 | Kim ..................... | H04L 5/0048 370/329 |
| 2013/0021980 A1* | 1/2013 | Yang .................... | H04B 7/0626 370/328 |

FOREIGN PATENT DOCUMENTS

| | | |
|---|---|---|
| WO | 2011/122911 A2 | 10/2011 |
| WO | 2012/011718 A2 | 1/2012 |

OTHER PUBLICATIONS

International Search Report issued in PCT/JP2013/067237 mailed on Jul. 16, 2013 (2 pages).
(Continued)

*Primary Examiner* — Dady Chery
(74) *Attorney, Agent, or Firm* — Osha Liang LLP

(57) ABSTRACT

To make it possible to feed back channel state information adequately even when a plurality of pieces of channel state information are generated in a user terminal, a user terminal that is configured to be able to conduct coordinated multi-point transmission/reception with a plurality of radio base stations has a generating section that generates a plurality of kinds of channel state information using channel state measurement reference signals transmitted from each radio base station, a selection section that selects predetermined channel state information to feed back, from the plurality of kinds of channel state information, and a transmission section that feeds back the predetermined channel state information to the radio base station via an uplink control channel, and the selection section selects the predetermined channel state
(Continued)

information based at least on the priorities assigned to the resource indices of channel state measurement reference signals corresponding to each channel state information.

13 Claims, 20 Drawing Sheets

(51) Int. Cl.
*H04L 5/00* (2006.01)
*H04W 72/04* (2009.01)
(52) U.S. Cl.
CPC .......... *H04L 5/0048* (2013.01); *H04L 5/0057* (2013.01); *H04L 5/0073* (2013.01); *H04L 5/0094* (2013.01); *H04W 72/0413* (2013.01)
(58) Field of Classification Search
USPC ................ 370/328, 329, 330, 336, 229, 341
See application file for complete search history.

(56) References Cited

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN); (Release 7)"; Sep. 2006 (57 pages).
Extended European Search Report issued in corresponding European Application No. 13808944.6 dated Jun. 13, 2016 (12 pages).
3GPP TS 36.213 v10.5.0 (Mar. 2012), Technical Specification Group Radio Access Network; Evolved Universal Terrestrial Radio Access (E-UTRA); Physical Layers Procedures (125 pages).

* cited by examiner

| PUCCH REPORT TYPE | REPORTED | MODE STATE | PUCCH REPORTING MODES | | | |
|---|---|---|---|---|---|---|
| | | | MODE 1-1 (BITS/BP) | MODE 2-1 (BITS/BP) | MODE 1-0 (BITS/BP) | MODE 2-0 (BITS/BP) |
| 1 | SUB-BAND CQI | RI = 1 | NA | 4+L | NA | 4+L |
| | | RI > 1 | NA | 7+L | NA | 4+L |
| 1a | SUB-BAND CQI/SECOND PMI | 8 ANTENNA PORTS RI = 1 | NA | 8+L | NA | NA |
| | | 8 ANTENNA PORTS 1 < RI < 5 | NA | 9+L | NA | NA |
| | | 8 ANTENNA PORTS RI > 4 | NA | 7+L | NA | NA |
| 2 | WIDEBAND CQI/PMI | 2 ANTENNA PORTS RI = 1 | 6 | 6 | NA | NA |
| | | 4 ANTENNA PORTS RI = 1 | 8 | 8 | NA | NA |
| | | 2 ANTENNA PORTS RI > 1 | 8 | 8 | NA | NA |
| | | 4 ANTENNA PORTS RI > 1 | 11 | 11 | NA | NA |
| 2a | WIDEBAND FIRST PMI | 8 ANTENNA PORTS RI < 3 | NA | 4 | NA | NA |
| | | 8 ANTENNA PORTS 2 < RI < 8 | NA | 2 | NA | NA |
| | | 8 ANTENNA PORTS RI = 8 | NA | 0 | NA | NA |
| 2b | WIDEBAND CQI/SECOND PMI | 8 ANTENNA PORTS RI = 1 | 8 | 8 | NA | NA |
| | | 8 ANTENNA PORTS 1 < RI < 4 | 11 | 11 | NA | NA |
| | | 8 ANTENNA PORTS RI = 4 | 10 | 10 | NA | NA |
| | | 8 ANTENNA PORTS RI > 4 | 7 | 7 | NA | NA |
| 2c | WIDEBAND CQI/FIRST PMI/SECOND PMI | 8 ANTENNA PORTS RI = 1 | 8 | — | NA | NA |
| | | 8 ANTENNA PORTS 1 < RI ≤ 4 | 11 | — | NA | NA |
| | | 8 ANTENNA PORTS 4 < RI ≤ 4 | 9 | — | NA | NA |
| | | 8 ANTENNA PORTS RI = 8 | 7 | — | NA | NA |
| 3 | RI | 2-LAYER SPATIAL MULTIPLEXING | 1 | 1 | 1 | 1 |
| | | 4-LAYER SPATIAL MULTIPLEXING | 2 | 2 | 2 | 2 |
| | | 8-LAYER SPATIAL MULTIPLEXING | 3 | 3 | NA | NA |
| 4 | WIDEBAND CQI | RI = 1 OR RI > 1 | NA | NA | 4 | 4 |
| 5 | RI/FIRST PMI | 8 ANTENNA PORTS, 2-LAYER SPATIAL MULTIPLEXING | 4 | NA | NA | NA |
| | | 8 ANTENNA PORTS, 4 AND 8-LAYER SPATIAL MULTIPLEXING | 5 | NA | NA | NA |
| 6 | RI/PTI | 8 ANTENNA PORTS, 2-LAYER SPATIAL MULTIPLEXING | NA | 2 | NA | NA |
| | | 8 ANTENNA PORTS, 4-LAYER SPATIAL MULTIPLEXING | NA | 3 | NA | NA |
| | | 8 ANTENNA PORTS, 8-LAYER SPATIAL MULTIPLEXING | NA | 4 | NA | NA |

FIG.4

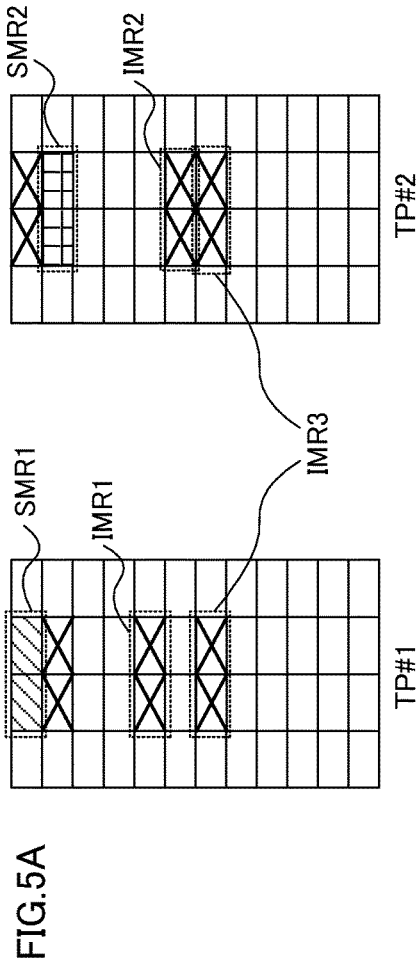

| TP#1(CELL INDEX : 0) | TP#2(CELL INDEX : 1) |
|---|---|
| CSI1 WITH SMR1/IMR1 (TYPE 4 : WB CQI) | CSI3 WITH SMR2/IMR2 (TYPE 4 : WB CQI) |
| CSI2 WITH SMR1/IMR3 (TYPE 4 : WB CQI) | CSI4 WITH SMR2/IMR3 (TYPE 1 : SB CQI) |

FIG.5C

| CSI1 WITH SMR1/IMR1 (TYPE 4 : WB CQI) | CSI3 WITH SMR2/IMR2 (TYPE 4 : WB CQI) |
|---|---|
| CSI2 WITH SMR1/IMR3 (TYPE 4 : WB CQI) | CSI4 → EXCLUDE(DROP) |

↑ PUCCH REPORT TYPE

FIG.5D

| CSI1 WITH SMR1/IMR1 (TYPE 4 : WB CQI) | CSI3 → EXCLUDE(DROP) |
|---|---|
| CSI2 WITH SMR1/IMR3 (TYPE 4 : WB CQI) | CSI4 → ALREADY EXCLUDED(DROP) |

↑ CELL INDEX

| SMR | IMR | UE EMULATION | TARGET TO WHICH PRIORITY IS ASSIGNED |
|---|---|---|---|
| PLURAL | PLURAL | NOT APPLIED | SMR INDEX, IMR INDEX |
| ONE | PLURAL | NOT APPLIED | IMR INDEX |
| PLURAL | ONE | NOT APPLIED | SMR INDEX |
| PLURAL | PLURAL | APPLIED | SMR INDEX, IMR INDEX, NZP CSI-RS INDEX OR SMR INDEX, UE EMULATION INDEX |
| PLURAL | ONE | APPLIED | SMR INDEX, NZP CSI-RS INDEX OR SMR INDEX, UE EMULATION INDEX |

| TP#1(CELL INDEX : 0) | TP#2(CELL INDEX : 1) |
|---|---|
| CSI1 WITH SMR1/IMR1 (TYPE 4 : WB CQI) | CSI3 WITH SMR2/IMR2 (TYPE 4 : WB CQI) |
| CSI2 WITH SMR1/IMR3 (TYPE 4 : WB CQI) | CSI4 WITH SMR2/IMR3 (TYPE 1 : SB CQI) |

FIG.7B

PUCCH REPORT TYPE ↑

| | |
|---|---|
| CSI1 WITH SMR1/IMR1 (TYPE 4 : WB CQI) | CSI3 WITH SMR2/IMR2 (TYPE 4 : WB CQI) |
| CSI2 WITH SMR1/IMR3 (TYPE 4 : WB CQI) | CSI4 → EXCLUDE (DROP) |

FIG.7C

SMR/IMR INDEX (SMR>IMR) ↑
SMR1>SMR2
IMR2>IMR1>IMR3

| | |
|---|---|
| CSI1 WITH SMR1/IMR1 (TYPE 4 : WB CQI) | CSI3 → EXCLUDE FIRST (DROP) |
| CSI2 → EXCLUDE SECOND (DROP) | CSI4 → ALREADY EXCLUDED (DROP) |

FIG.7D

SMR/IMR INDEX (SMR<IMR) ↑
SMR1>SMR2
IMR2>IMR1>IMR3

| | |
|---|---|
| CSI1 → EXCLUDE SECOND (DROP) | CSI3 WITH SMR2/IMR2 (TYPE 4 : WB CQI) |
| CSI2 → EXCLUDE FIRST (DROP) | CSI4 → ALREADY EXCLUDED (DROP) |

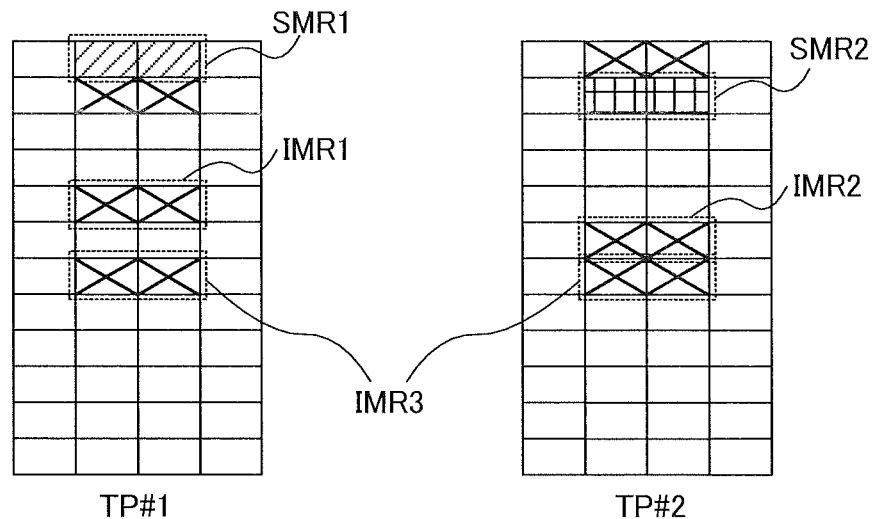
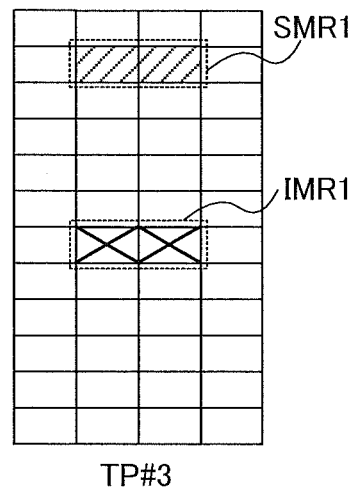
FIG.8

| SMR | IMR | UE EMULATION | TARGET TO WHICH PRIORITY IS ASSIGNED |
|---|---|---|---|
| PLURAL | PLURAL | NOT APPLIED | CELL INDEX, SMR INDEX, IMR INDEX |
| ONE | PLURAL | NOT APPLIED | CELL INDEX, IMR INDEX |
| PLURAL | ONE | NOT APPLIED | CELL INDEX, SMR INDEX |
| PLURAL | PLURAL | APPLIED | CELL INDEX, SMR INDEX, IMR INDEX, NZP CSI-RS INDEX<br>OR<br>CELL INDEX, SMR INDEX, UE EMULATION INDEX |
| PLURAL | ONE | APPLIED | CELL INDEX, SMR INDEX, NZP CSI-RS INDEX<br>OR<br>CELL INDEX, SMR INDEX, UE EMULATION INDEX |

FIG.9

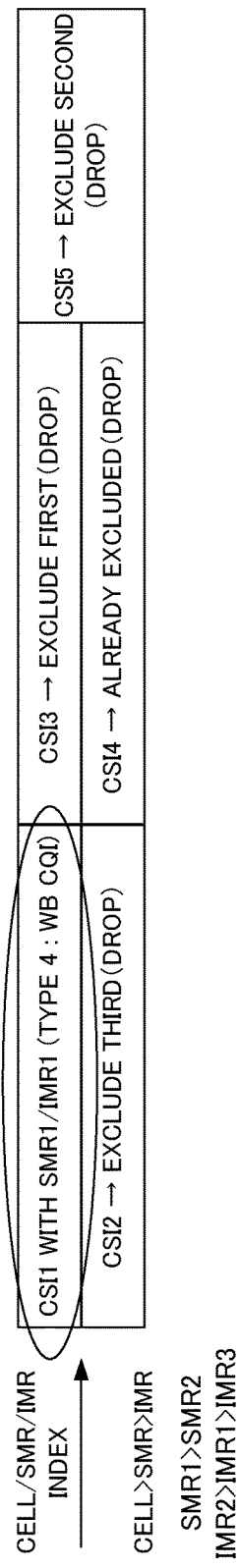

| SMR | IMR | UE EMULATION | TARGET TO WHICH PRIORITY IS ASSIGNED |
|---|---|---|---|
| PLURAL | PLURAL | NOT APPLIED | COMBINED INDEX OF SMR AND IMR, OR CSI INDEX |
| ONE | PLURAL | NOT APPLIED | COMBINED INDEX OF SMR AND IMR, OR CSI INDEX |
| PLURAL | ONE | NOT APPLIED | COMBINED INDEX OF SMR AND IMR, OR CSI INDEX |
| PLURAL | PLURAL | APPLIED | COMBINED INDEX OF SMR, IMR, AND NZP CSI-RS INDEX<br>OR<br>COMBINED INDEX OF SMR AND UE EMULATION<br>OR<br>CSI INDEX |
| PLURAL | ONE | APPLIED | COMBINED INDEX OF SMR, IMR, AND NZP CSI-RS INDEX<br>OR<br>COMBINED INDEX OF SMR AND UE EMULATION<br>OR<br>CSI INDEX |

| CSI1 WITH SMR1/IMR1 (TYPE 4 : WB CQI) | CSI3 WITH SMR2/IMR2 (TYPE 4 : WB CQI) |
|---|---|
| CSI2 WITH SMR1/IMR3 (TYPE 4 : WB CQI) | CSI4 WITH SMR2/IMR3 (TYPE 1 : SB CQI) |

TP#1 (CELL INDEX : 0)     TP#2 (CELL INDEX : 1)

FIG.12B

| CSI1 WITH SMR1/IMR1 (TYPE 4 : WB CQI) | CSI3 WITH SMR2/IMR2 (TYPE 4 : WB CQI) |
|---|---|
| CSI2 WITH SMR1/IMR3 (TYPE 4 : WB CQI) | CSI4 → EXCLUDE (DROP) |

↑ PUCCH REPORT TYPE

FIG.12C

| CSI1 WITH SMR1/IMR1 (TYPE 4 : WB CQI) | CSI3 WITH SMR2/IMR2 (TYPE 4 : WB CQI) |
|---|---|
| CSI2 → EXCLUDE (DROP) | CSI4 → ALREADY EXCLUDED (DROP) |

↑ COMBINED INDEX

SMR1/IMR1 : 0
SMR2/IMR2 : 1
SMR1/IMR3 : 2

FIG.14A

| TP#1(CELL INDEX : 0) | TP#2(CELL INDEX : 2) | TP#3(CELL INDEX : 1) |
|---|---|---|
| CSI1 WITH SMR1/IMR1 (TYPE 4 : WB CQI) | CSI3 WITH SMR2/IMR2 (TYPE 4 : WB CQI) | CSI5 WITH SMR1/IMR1 (TYPE 4 : WB CQI) |
| CSI2 WITH SMR1/IMR3 (TYPE 4 : WB CQI) | CSI4 WITH SMR2/IMR3 (TYPE 1 : SB CQI) | |

FIG.14B

PUCCH REPORT TYPE ↑

| CSI1 WITH SMR1/IMR1 (TYPE 4 : WB CQI) | CSI3 WITH SMR2/IMR2 (TYPE 4 : WB CQI) | CSI5 WITH SMR1/IMR1 (TYPE 4 : WB CQI) |
|---|---|---|
| CSI2 WITH SMR1/IMR3 (TYPE 4 : WB CQI) | CSI4 → EXCLUDE (DROP) | |

FIG.14C

COMBINED INDEX ↑

| CSI1 WITH SMR1/IMR1 (TYPE 4 : WB CQI) | CSI3 → EXCLUDE FIRST (DROP) | CSI5 → EXCLUDE THIRD (DROP) |
|---|---|---|
| CSI2 → EXCLUDE SECOND (DROP) | CSI4 → ALREADY EXCLUDED (DROP) | |

TP1/SMR1/IMR1 : 0
TP3/SMR1/IMR1 : 1
TP1/SMR1/IMR3 : 2
TP2/SMR2/IMR2 : 3

USER TERMINAL, RADIO COMMUNICATION SYSTEM, RADIO COMMUNICATION METHOD AND RADIO BASE STATION

TECHNICAL FIELD

The present invention relates to a user terminal, a radio communication system, a radio communication method and a radio base station in a next-generation mobile communication system.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. Meanwhile, in an LTE system, it is possible to achieve a transmission rate of about maximum 300 Mbps on the downlink and about 75 Mbps on the uplink by using a variable band, which ranges from 1.4 MHz to 20 MHz. Also, in the UMTS network, successor systems of the LTE system (referred to as, for example, "LTE-advanced" or "LTE enhancement" (hereinafter referred to as "LTE-A")) are under study for the purpose of achieving further broadbandization and increased speed.

In the downlink of the LTE system (for example, Rel. 8), CRSs (Cell-specific Reference Signals), which are associated with cell IDs, are defined. These CRSs are used to demodulate user data, and, in addition, used to measure downlink channel quality (CQI: Channel Quality Indicator) for scheduling and adaptive control, and so on. Meanwhile, in the downlink of successor systems of LTE (for example, Rel. 10), CSI-RSs (Channel State Information-Reference Signals) are under study as reference signals for measurements of channel state information (CSI).

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

Now, as a promising technique for further improving the system performance of the LTE system, there is inter-cell orthogonalization. For example, in the LTE-A system, intra-cell orthogonalization is made possible by orthogonal multiple access on both the uplink and the downlink. That is to say, on the downlink, orthogonality is established between user terminal UEs (User Equipment) in the frequency domain. On the other hand, between cells, like in W-CDMA, interference randomization by one-cell frequency re-use is fundamental.

So, in the 3GPP (3rd Generation Partnership Project), coordinated multi-point transmission/reception (CoMP) techniques are under study as techniques to realize inter-cell orthogonalization. In this CoMP transmission/reception, a plurality of cells coordinate and perform signal processing for transmission and reception for one user terminal UE or for a plurality of user terminal UEs. By employing these CoMP transmission/reception techniques, improvement of throughput performance is expected, especially with respect to user terminal UEs located on cell edges.

In this way, in the LTE-A system, there are transmission modes to transmit from a plurality of transmission points to a user terminal, in addition to transmission modes to transmit from one transmission point to a user terminal. Consequently, it is important to determine the channel state in a user terminal by taking into account the interference between a plurality of transmission points and so on, and feed back channel state information (CSI) to the radio base station.

Meanwhile, when feeding back a plurality of kinds of channel state information that is generated in a user terminal via an uplink control channel (PUCCH: Physical Uplink Control Channel) all at the same time, there is a threat that a plurality of pieces of channel state information collide with each other (collision). Also, when feeding back a plurality of kinds of channel state information via an uplink shared channel (PUSCH: Physical Uplink Shared Channel) all at the same time, it is necessary to determine the order of allocating the plurality of kinds of channel state information and so on.

The present invention has been made in view of the above, and it is therefore an object of the present invention to provide a user terminal, a radio communication system, a radio communication method and a radio base station, whereby, even when a plurality of pieces of channel state information are generated in a user terminal, it is still possible to feed back the channel state information adequately.

Solution to Problem

The user terminal of the present invention is a user terminal that is configured to be able to conduct coordinated multi-point transmission/reception with a plurality of radio base stations, and this user terminal has a generating section that generates a plurality of kinds of channel state information using channel state measurement reference signals transmitted from each radio base station, a selection section that selects predetermined channel state information to feed back, from the plurality of kinds of channel state information, and a transmission section that feeds back the predetermined channel state information to the radio base stations via an uplink control channel, and, in this user terminal, the selection section selects the predetermined channel state information based at least on priorities assigned to resource indices of the channel state measurement reference signals corresponding to each channel state information.

Advantageous Effects of Invention

According to the present invention, even when a plurality of pieces of channel state information are generated in a user terminal, it is still possible to feed back the channel state information adequately.

BRIEF DESCRIPTION OF DRAWINGS

FIG. 4 is a diagram to show PUCCH report types;

FIG. 5 provides diagrams to explain an example of a feedback CSI selection method (CSI dropping and reporting);

FIG. 6 is a diagram to show the target to which priorities are assigned in a feedback CSI selection method for when CoMP is applied/CA is not applied according to a first example;

FIG. 7 provides diagrams to explain an example of a feedback CSI selection method (CSI dropping and reporting) for when CoMP is applied/CA is not applied according to the first example;

FIG. 8 is a diagram to show examples of patterns of SMRs and IMRs where CSI-RSs are arranged in each transmission point when CoMP is applied/CA is applied;

FIG. 9 is a diagram to show the target to which priorities are assigned in a feedback CSI selection method for when CoMP is applied/CA is applied according to the first example;

FIG. 10 provides diagrams to explain an example of a feedback CSI selection method (CSI dropping and reporting) for when CoMP is applied/CA is applied according to the first example;

FIG. 11 is a diagram to show the target to which priorities are assigned in a feedback CSI selection method for when CoMP is applied/CA is not applied according to a second example;

FIG. 12 provides diagrams to explain an example of a feedback CSI selection method (CSI dropping and reporting) for when CoMP is applied/CA is not applied according to the second example;

FIG. 14 provides diagram to explain an example of a feedback CSI selection method (CSI dropping and reporting) for when CoMP is applied/CA is applied according to the second example;

DESCRIPTION OF EMBODIMENTS

Now, an embodiment of the present invention will be described below in detail with reference to the accompanying drawings.

Figure 1A:
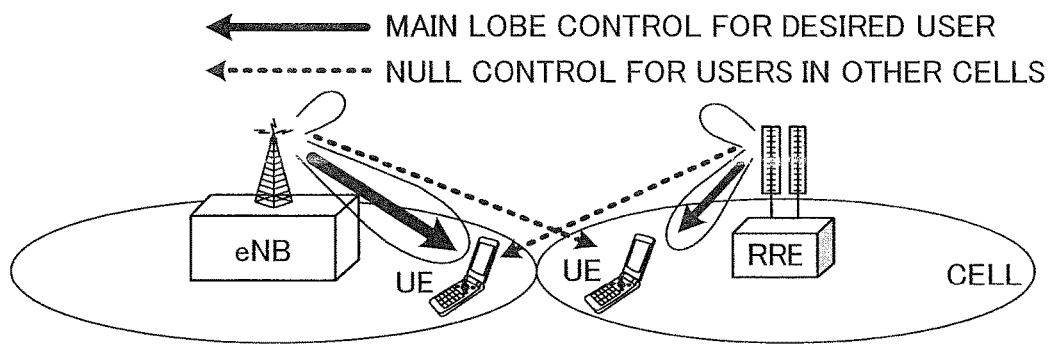
FIG. 1 provides diagrams to explain coordinated multi-point transmission.
Figure 1B:
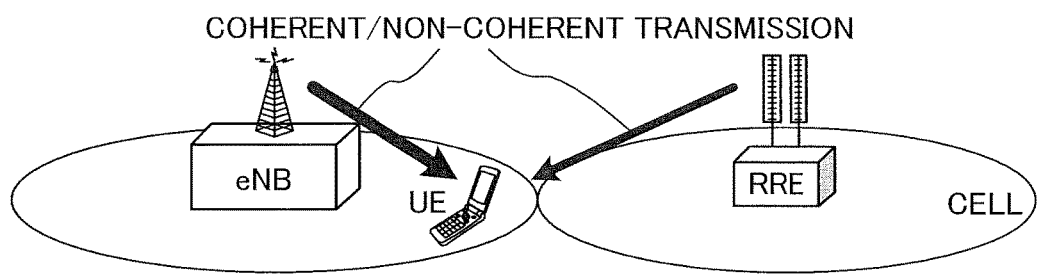
Figure 1C:
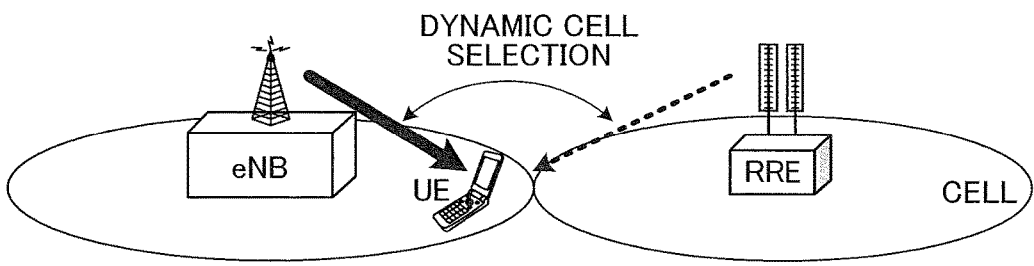

First, coordinated multi-point (CoMP) transmission on the downlink will be described with reference to FIG. 1. Downlink CoMP transmission includes coordinated scheduling/coordinated beamforming (CS/CB), and joint processing. Coordinated scheduling/coordinated beamforming refers to a method of transmitting a shared data channel from only one transmitting/reception point (or radio base station, cell, etc.) to one user terminal UE, and, as shown in FIG. 1A, allocates radio resources in the frequency/space domain, taking into account interference from other transmitting/reception points, interference against other transmitting/reception points, and so on. Meanwhile, joint processing refers to a method of transmitting a shared data channel from a plurality of transmitting/reception points all at the same time by applying precoding, and includes joint transmission to transmit a shared data channel from a plurality of transmitting/reception points to one user terminal UE as shown in FIG. 1B, and dynamic point selection (DPS) to select one transmission/reception point dynamically and transmit a shared data channel as shown in FIG. 1C. There is also a transmission mode referred to as "dynamic point blanking (DPB)," which stops data transmission in a certain region with respect to a transmitting/reception point that causes interference.

CoMP transmission is applied to improve the throughput of user terminals located on cell edges. Consequently, control is designed to apply CoMP transmission when there is a user terminal located on a cell edge. In this case, a radio base station apparatus finds differences between the quality information of each cell provided from the user terminal (for example, the RSRP (Reference Signal Received Power), the RSRQ (Reference Signal Received Quality), the SINR (Signal Interference plus Noise Ratio) and so on), and, when the differences equal or fall below a threshold value—that is, when there is little difference in quality between the cells—decides that the user terminal is located on a cell edge, and applies CoMP transmission.

When CoMP transmission is applied, the user terminal generates channel state information (CSI) based on CSI-RSs that are transmitted from each transmission point, and feeds back the channel state information (CSI reports) to the radio base station apparatus of the serving cell.

CSI-RSs are reference signals to be used to measure CSI such as CQIs (Channel Quality Indicators), PMIs (Precoding Matrix Indicators), and RIs (Rank Indicators) as channel states. Unlike CRSs (Cell-specific Reference Signals) that are allocated to all subframes, CSI-RSs are allocated to radio resources in a predetermined cycle (for example, in a 10-subframe cycle). Also, CSI-RSs are specified by the parameters of position, sequence and transmission power. The positions of CSI-RSs include subframe offset, cycle and subcarrier-symbol offset (index).

Note that, as CSI-RSs, non-zero-power CSI-RSs (NZP CSI-RSs) and zero-power CSI-RSs (ZP CSI-RSs) are defined. With non-zero-power CSI-RSs, transmission power is distributed to the resources where CSI-RSs are allocated, and, with zero-power CSI-RSs, transmission power is not distributed to the resources where CSI-RSs are allocated (that is, the CSI-RSs are muted).

In one subframe defined in LTE, CSI-RSs are allocated not to overlap the control signals allocated to a downlink control channel (PDCCH: Physical Downlink Control Channel), the user data allocated to a downlink shared channel (PDSCH: Physical Downlink Shared Channel), and other reference signals such as CRSs and DM-RSs (DeModulation-Reference Signals). One subframe is formed with twelve subcarriers that are consecutive in the frequency direction and fourteen symbols (one resource block pair) that are consecutive in the time axis direction. Also, from the perspective of suppressing the PAPR, two resource elements (REs) that neighbor each other along the time axis direction are allocated as a set, as resources where a CSI-RS can be allocated.

When calculating channel states using CSI-RSs, it becomes important to take into account the impact of interference from other transmission points (other cells). However, given that the density of CSI-RSs in one resource block as defined in LTE (Rel. 10) is low, it is difficult to measure interference from other transmission points with high accuracy. So, a study is in progress to estimate interference from other transmission points by using a CSI-RS (desired signal measurement CSI-RS) that is used to estimate desired signal power, and a CSI-RS (interference estimation reference signal) that is used to estimate interference signal power.

Figure 2A:
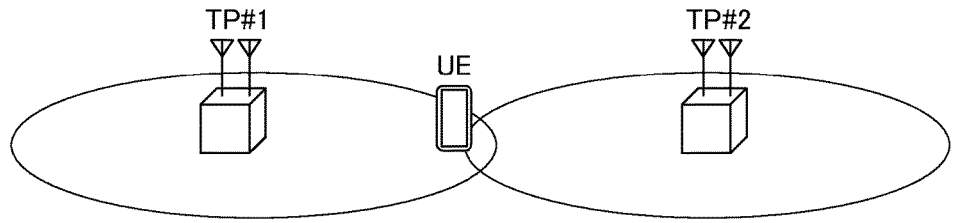
FIG. 2 provides diagrams to show examples of patterns of desired signal estimation resources (SMRs) and interference signal estimation resources (IMRs) where CSI-RSs are arranged in each transmission point.
Figure 2B:
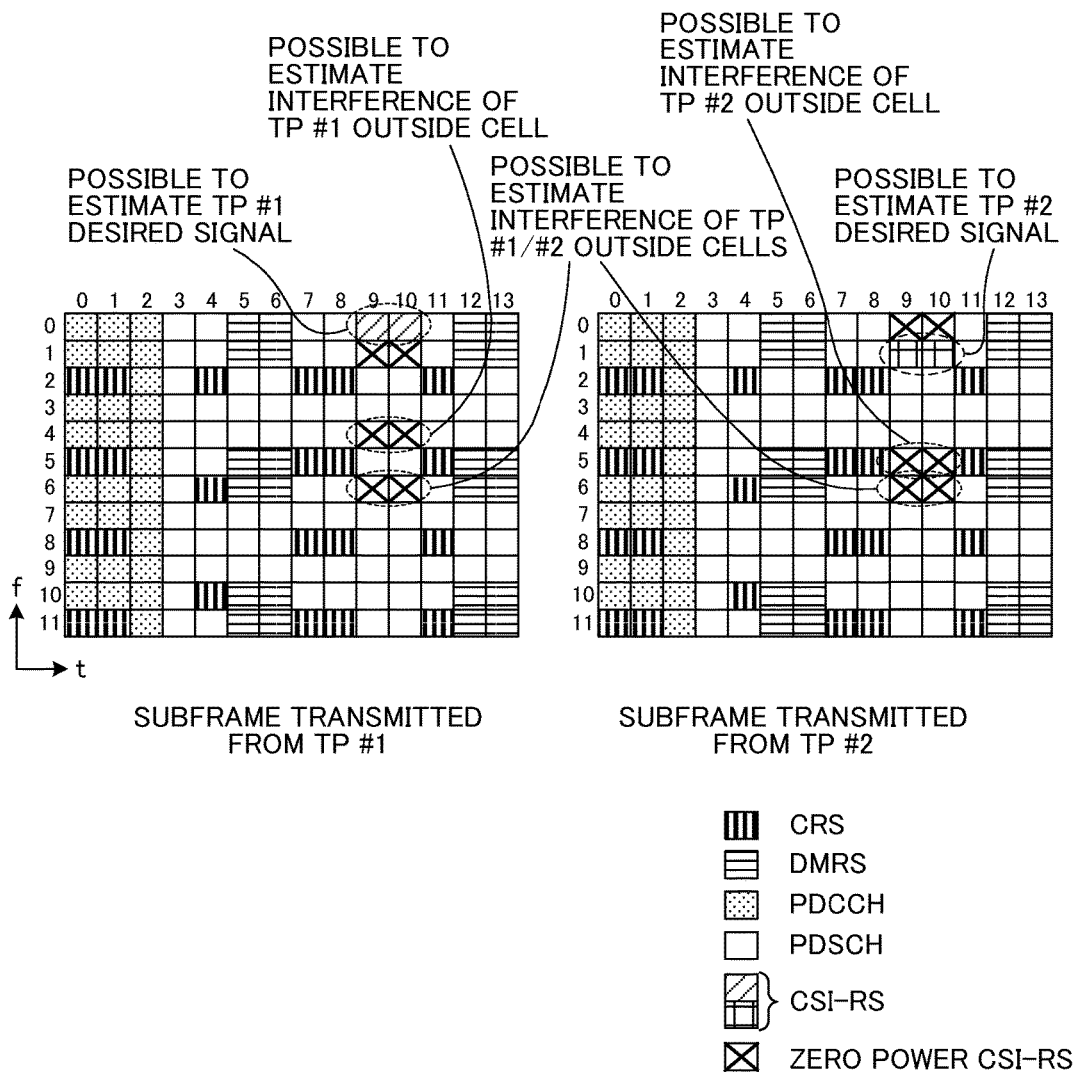

FIG. 2A is a schematic diagram of a case where downlink transmission is carried out from transmission points TP #1 and TP #2, which serve as a CoMP set, to a user terminal UE. FIG. 2B shows examples of placement patterns of desired signal estimation CSI-RSs (non-zero power CSI-RSs) and interference signal estimation CSI-RSs (zero power CSI-RSs). The desired signal estimation CSI-RSs are allocated to resources that are used to estimate desired signals (SMRs: Signal Measurement Resources), and the interference signal estimation CSI-RSs are allocated to resources that are used to measure interference signals (IMRs: Interference Measurement Resources). Also, in FIG. 2B, the subframe on the left side is the subframe that is transmitted from TP #1, and the subframe on the right side is the subframe that is transmitted from TP #2.

The user terminal generates channel state information (for example, CQI) based on the desired signal estimation resources (SMRs) and interference signal estimation resources (IMRs), and sends a feedback to the radio base station. That is, the user terminal is able to generate a plurality of kinds of CSI, depending on the placement patterns of desired signal estimation resources (SMRs) and interference signal estimation resources (IMRs) in each transmission point.

Information about the desired signal estimation resources (SMRs) and interference signal estimation resources (IMRs) may be sent by means of, for example, broadcast signals (such as master information blocks (MIBs) that are transmitted using a physical broadcast channel, system information blocks (SIBs) that are multiplexed on a data channel, and so on), or may be reported from the radio base station to the user terminal by means of higher layer signaling, RRC signaling, medium access control (MAC) signals, or downlink control information.

FIG. 3 shows examples of placement patterns of desired signal estimation resources (SMRs) and/or interference signal estimation resources (IMRs) that are placed in each transmission point. Note that FIG. 3 shows examples of patterns of SMRs and IMRs (CSI-RS patterns) by extracting only one resource block of predetermined symbols (the eighth to eleventh symbols) from FIG. 2, and other signals (CRSs, DM-RSs, PDSCH and so on) are omitted. Also, although examples of transmission from two transmission points (TP #1 and TP #2) will be shown in the following description, the number of transmission points is by no means limited to this.

Figure 3A:
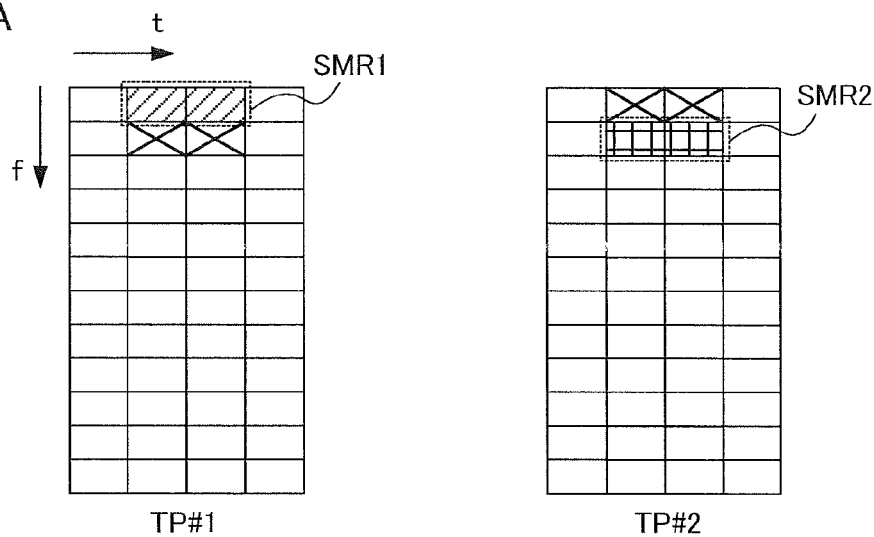
FIG. 3 provides diagrams to show examples of patterns of placing SMRs and/or IMRs where CSI-RSs transmitted from a plurality of transmission points are placed.

FIG. 3A shows a case where desired signal estimation resources SMR 1 and SMR 2 are placed in regions of different frequencies in each transmission point (TP #1 and TP #2). The user terminal can measure the intensity of desired signals from TP #1 based on SMR 1, and measure the intensity of desired signals from TP #2 based on SMR 2. Also, FIG. 3A shows a case where no interference signal estimation resources (IMRs) are placed.

Figure 3B:
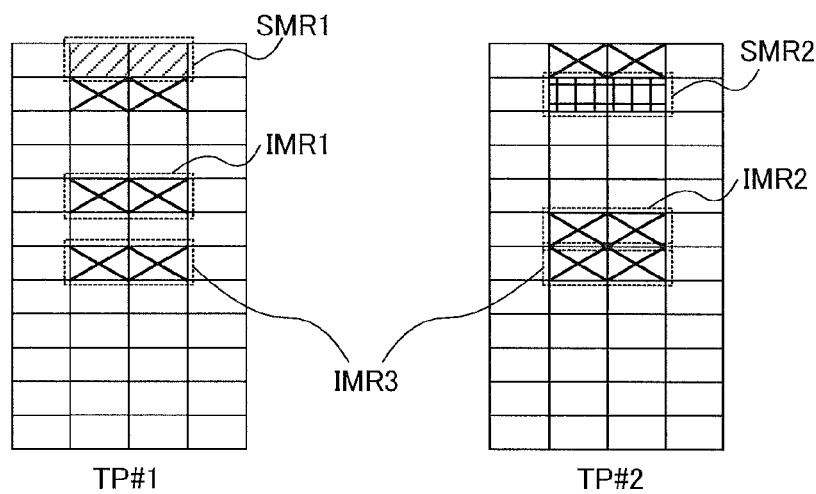

FIG. 3B shows a case where, in each transmission point (TP #1 and TP #2), desired signal estimation resources SMR 1 and SMR 2 are placed in regions of different frequencies, and where a plurality of interference signal estimation resources (IMR 1 to IMR 3) are placed. IMR 1 makes the PDSCH of predetermined resources transmitted from TP #1 zero power, IMR 2 makes the PDSCH of predetermined resources transmitted from TP #2 zero power, and IMR 3 makes the PDSCH of predetermined resources transmitted from TP #1 and TP #2 zero power.

The user terminal can measure interference from outside TP #1 based on IMR 1, measure interference from outside TP #2 based on IMR 2, and measure interference from outside TP #1 and TP #2 based on IMR 3. Also, the user terminal generates CSI using SMR 1, SMR 2 and IMR 1 to IMR 3, and sends a feedback to the radio base station.

For example, the user terminal can calculate channel quality (CSI 1) with respect to TP #1 upon single transmission based on SMR 1/IMR 1, and calculate channel quality (CSI 2) with respect to TP #2 upon single transmission based on SMR 2/IMR 2. Also, upon coordinated (CoMP) transmission, the user terminal can calculate channel quality (CSI 3) with respect to TP #1 based on SMR 1/IMR 3, and calculate channel quality (CSI 4) with respect to TP #2 based on SMR 2/IMR 3. In this way, the user terminal is able to generate a plurality of kinds of channel quality (CSI processes) based on SMRs and IMRs. Note that the above-noted definitions of CSI are examples and are by no means limiting.

Figure 3C:
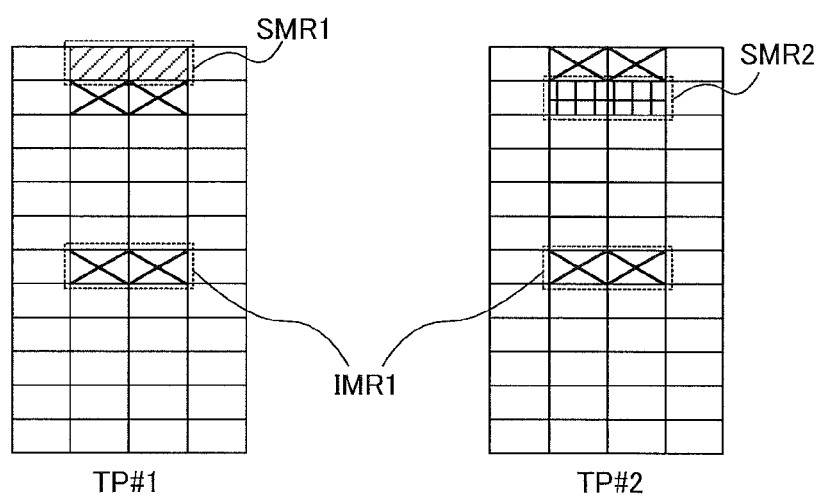

FIG. 3C shows a case where, in each transmission point (TP #1 and TP #2), desired signal estimation resources SMR 1 and SMR 2 are placed in regions of different frequencies, and where one interference signal estimation resource IMR 1 is placed in the same frequency region. IMR 1 makes the PDSCH of predetermined resources transmitted from TP #1 and TP #2 zero power.

In FIG. 3C, the user terminal can measure interference from outside TP #1 and TP #2 based on interference signal estimation resource IMR 1. Meanwhile, in FIG. 3C, no separate interference signal estimation resource is placed in TP #1, and therefore it is not possible to directly measure interference from outside TP #1 using IMRs alone, unlike the case shown in FIG. 3B. In this case, the user terminal can measure other interferences indirectly by using SMRs and IMRs (emulation). An example of emulation which the user terminal performs in FIG. 3C will be described below.

First, the user terminal measures the intensity of desired signals ($S_1$) from TP #1 based on SMR 1, and measures the intensity of desired signals ($S_2$) from TP #2 based on SMR 2. Also, the user terminal measures interference from outside TP #1 and TP #2 ($I_{out}$) based on IMR 1. Then, the user terminal determines interference from outside TP #1 upon single-cell transmission by calculating "$I_{out}+S_2$." Determining predetermined interference by using SMRs and IMRs in this way is referred to as "emulation (UE emulation)." When the user terminal carries out emulation, the number of IMRs to place can be reduced. Note that the UE emulation having been described using FIG. 3C is simply an example and is by no means limiting.

After having generated a plurality of kinds of channel state information using SMRs and IMRs, the user terminal feeds back the generated channel state information to the radio base station via the uplink.

Signals to be transmitted from the user terminal via the uplink are mapped to adequate radio resources and transmitted to the radio base station. User data is allocated to an uplink shared channel (PUSCH). Also, control information is time-multiplexed with the PUSCH when transmitted simultaneously with user data, or allocated to an uplink control channel (PUCCH) when transmitted alone. This control information to be transmitted on the uplink includes CSI, retransmission acknowledgement signals (ACK/NACK) for the downlink shared channel (PDSCH) signal, and so on.

When the user terminal feeds back a plurality of kinds of channel state information generated based on SMRs and IMRs from the same transmission point or different transmission points via the PUCCH at the same time, there is a threat of collisions, due to the limited capacity of PUCCH resources. So, assuming a case where the user terminal generates a plurality of pieces of feedback channel state information (CSI reports), the present inventors have conceived of selectively feeding back CSI reports of high priority. To be more specific, the present inventors have found out that it is possible to reduce the collisions of CSI by assigning priorities to a plurality of kinds of channel state information to feed back, and selectively feeding back the channel state information of higher priorities.

Also, the present inventors have focused on the method of selecting feedback channel state information (CSI reports) when carrier aggregation (CA) is applied, as the method of determining the priority of feedback channel state information.

In carrier aggregation (CA), in downlink transmission, the system band is widened by aggregating a plurality of fundamental frequency blocks (component carriers (CCs)) of different frequency bands. Meanwhile, as for uplink transmission, a study is in progress to carry out uplink data transmission using a single fundamental frequency block in order to achieve single-carrier characteristics.

That is to say, when channel state information to correspond to each CC is fed back via the PUCCH of predetermined CCs, there is threat that a plurality of pieces of channel state information collide with each other. Consequently, a study is in progress to assign priorities to the PUCCH report types shown in FIG. 4 and cell indices, and select the CSI to feed back based on these priorities, when CA is applied.

For example, as the setting of priorities for the channel report types, the priority of RIs is set higher than those of PMIs and CQIs, and the priority of wideband CQIs is set higher than that of subband CQIs. Then, in a plurality of kinds of channel state information, the channel state information of lower priorities is not fed back (channel state information of lower priorities is dropped).

To be more specific, as for CSI from one serving cell, the priorities of PUCCH report types 3, 5 or 6 are set higher than those of PUCCH report types 1, 1a, 2, 2a, 2b, 2c and 4. Also, as for CSI from a plurality of serving cells, the priorities of PUCCH report types 3, 5, 6 or 2a are set higher than those of PUCCH report type 1, 1a, 2, 2b, 2c and 4, and the priorities of PUCCH report types 2, 2b, 2c or 4 are set higher than those of PUCCH report types 1 and 1a.

By this means, it is possible to drop the CSI with which the priority of the PUCCH report type is low, from a plurality of kinds of CSIs generated in the user terminal, and select the CSI with which the priority of the PUCCH report type is high.

When there are CSIs having the same PUCCH report type priority, the CSI to feed back is selected based on the priorities assigned to the cell indices to which each CSI corresponds. For example, when CSI related to a CC of a smaller cell index is assigned a higher priority than the priority of CSI related to a CC of a larger cell index, if the priority of the PUCCH report type is the same between the CSIs, the CSI to correspond to the CC of the large cell index is dropped. In this way, by selecting the CSI to feed back via the PUCCH based on the priorities assigned to PUCCH report types and the priorities assigned to cell indices, it is possible to prevent collisions of CSI.

However, upon studying this, the present inventors have found out that there is a threat of collisions of CSI when the method of selecting feedback channel state information (CSI dropping rules) upon carrier aggregation (CA) is applied to the CSI feedback upon coordinated multi-point transmission. This case will be described with reference to FIG. 5.

FIG. 5A illustrates a case where, in a given subframe, channel state measurement reference signals (desired signal estimation CSI-RSs and interference signal estimation CSI-RSs) are transmitted from two transmission points (TP #1 and TP #2) that serve as a CoMP set. Note that FIG. 5A shows the same CSI-RS placement patterns as those shown in above FIG. 3B.

The desired signal estimation CSI-RSs (NZP CSI-RSs) are allocated to SMR 1, which is placed in predetermined resources for TP #1, and to SMR 2, which is placed in predetermined resources for TP #2. Also, the interference signal estimation CSI-RSs (ZP CSI-RSs) are allocated to IMR 1, which is placed in predetermined resources for TP #1, to IMR 2, which is placed in predetermined resources for TP #2, and to IMR 3, which is placed in predetermined resources for TP #1 and TP #2.

Also, FIG. 5 illustrates a case where the user terminal generates a plurality of kinds of channel state information (for example, CSI 1 to CSI 4) based on a plurality of SMRs 1 and 2 and IMRs 1 to 3 (see FIG. 5B).

Here, CSI 1 (SMR 1/IMR 1) is equivalent to the channel quality of TP #1 (cell index: 0) upon single-cell transmission, in the event of PUCCH report type 4 and wideband CQI. CSI 2 (SMR 1/IMR 3) is equivalent to the channel quality of TP #1 upon coordinated transmission, in the event of PUCCH report type 4 and wideband CQI. CSI 3 (SMR 2/IMR 2) is equivalent to the channel quality of TP #2 (cell index: 1) upon single-cell transmission in the event of PUCCH report type 4 and wideband CQI. CSI 4 (SMR 2/IMR 3) is equivalent to the channel quality of TP #2 upon coordinated transmission in the event of PUCCH report type 1 and subband CQI. Note that the content of and the method of calculating each CSI are by no means limited to these.

When the user terminal uses a feedback channel state information selection method for when CA is applied, the user terminal selects CSI with which the priority of the PUCCH report type is high, from a plurality of kinds of CSIs (here, CSI 1 to CSI 4) (that is, drops CSI of low priority). Here, the priority of PUCCH report type 1 is lower than that of PUCCH report type 4, and therefore CSI 4 is dropped (see FIG. 5C).

Next, with reference to the priorities of the cell indices of the transmission points corresponding to each CSI, CSI of higher priority is selected from the rest of the CSIs (CSI 1, CSI 2 and CSI 3) (that is, CSI of lower priority is dropped). Here, the transmission point of the smaller cell index (TP #1) is determined to have a higher priority than the transmission point of the larger cell index (TP #2), and therefore CSI 3 is dropped (see FIG. 5D). As a result of this, CSI 1 and CSI 2 remain.

CSI 1 and CSI 2 are both CSI that is generated based on different IMRs placed in one transmission point (TP #1), and therefore the PUCCH report type and the cell index are the same (the same priority). In this way, with the feedback channel state information selection method for when CA is applied, a plurality of kinds of feedback CSI cannot be classified completely, and therefore a problem arises that CSI 1 and CSI 2 collide with each other when fed back at the same time via the PUCCH. Also, when coordinated multi-point transmission/reception and carrier aggregation (CA) are applied at the same time, the same problem arises.

So, the present inventors have found out that collisions of CSI can be effectively reduced by assigning priorities to the indices of channel state measurement reference signal resources (desired signal estimation resources (SMRs) and/or interference signal estimation resources (IMRs) and so on) when coordinated multi-point transmission is applied, and selecting feedback CSI based on these priorities. Now, detailed descriptions will be given below with reference to the accompanying drawings.

First Example

A case will be described here, with a first example, where feedback CSI is selected from a plurality of kinds of CSIs generated in a user terminal, based on the priorities assigned to the indices of each piece of information (SMR, IMR, UE emulation, NZP CSI-RS and so on) that is used to generate each CSI. Also, in the following description, "when CoMP is applied/CA is not applied" and "when CoMP is applied/CA is applied" will be described separately.

<When CoMP is Applied/CA is not Applied>

When a user terminal generates CSI by applying SMRs and IMRs configuired in each transmission point (when emulation is not employed), the user terminal selects feedback CSI based on the priorities assigned to the resource indices of the CSI-RSs (SMR indices and/or IMR indices) corresponding to each CSI. To be more specific, as shown in FIG. 6, when a plurality of SMRs and IMRs are configured in a plurality of transmission points that serve as a CoMP set (see above FIG. 3B), feedback CSI is selected based on the priorities assigned to the SMR indices and IMR indices (that is, CSI that is not fed back is dropped).

Also, when one SMR and a plurality of IMRs are placed in multiple transmission points, feedback CSI is selected based on the priorities assigned to the IMR indices, and, when a plurality of SMRs and one IMR are placed, feedback CSI is selected based on the priorities assigned to the SMR indices.

When the user terminal carries out emulation to measure different interferences indirectly using SMRs and IMRs (when emulation is employed), the user terminal is able to select feedback CSI based on the priorities assigned to the SMR indices, the IMR indices, and the index of the non-zero power CSI-RS to use in emulation. Alternatively, feedback CSI may be selected based on the priorities assigned to the SMR indices and the UE emulation index.

Note that the non-zero power CSI-RS to use in emulation refers to, for example, the CSI-RS allocated to SMR 2 in above FIG. 3C. Also, as noted above, UE emulation corresponds to the combination of the IMRs and the non-zero power CSI-RS to use in emulation.

Information about the SMR indices, the IMR indices, the index of the non-zero power CSI-RS to use in emulation, and the UE emulation index may be sent by means of, for example, broadcast signals (such as master information blocks (MIBs) that are transmitted using a physical broadcast channel, system information blocks (SIBs) that are multiplexed on a data channel, and so on), or may be reported from the radio base station to the user terminal by means of higher layer signaling, RRC signaling, medium access control (MAC) signals, or downlink control information.

Also, the radio base station can assign priorities to the indices of each piece of information that is used to generate each CSI and report these to the user terminal. For example, as shown in FIG. 3B, when a plurality of IMRs are placed (when emulation is not employed), the radio base station sets the priorities of interference estimation IMRs upon single-cell transmission higher than the priorities of interference estimation IMRs upon coordinated transmission. For example, in the case shown in FIG. 3B, the radio base station sets the priorities of interference estimation IMR 1 and IMR 2 in single-cell transmission higher than the priority of interference estimation IMR 3 in coordinated transmission. This is because CSI in single-cell transmission is more important. When priorities are assigned such that smaller IMR indices are given higher priority, the interference estimation IMR indices in single-cell transmission are made relatively small.

Also, as shown in FIG. 3C, when the user terminal employs emulation, the radio base station sets the priority of UE emulation for interference estimation in single-cell transmission higher than the priority of UE emulation in coordinated transmission. When assigning a higher priority to the smaller UE emulation index, the UE emulation index in single-cell transmission is made relatively small.

Next, an example of a feedback CSI selection method (CSI dropping and reporting) upon coordinated multi-point transmission will be described with reference to FIG. 7. Note that FIG. 7 shows a case where channel state measurement reference signals (desired signal estimation CSI-RSs and interference signal estimation CSI-RSs) are transmitted from two transmission points (TP #1 and TP #2) that serve as a CoMP set.

Also, FIG. 7 shows a case where the user terminal generates plurality of kinds of channel state information (for example, CSI 1 to CSI 4) based on a plurality of SMRs 1 and 2 and IMRs 1 to 3. Note that CSIs 1 to 4 in FIG. 7A have the same contents as CSIs 1 to 4 shown in FIG. 5B.

First, the user terminal selects CSI with which the priority of the PUCCH report type is high, from a plurality of kinds of CSIs (here, CSI 1 to CSI 4) (that is, drops CSI of low priority). Here, the priority of PUCCH report type 1 is lower than that of PUCCH report type 4, and therefore CSI 4 is dropped (see FIG. 7B).

Next, from the rest of the CSIs (CSI 1, CSI 2 and CSI 3), the user terminal selects CSI with which the priorities of the resource indices (IMR/SMR indices) of the CSI-RSs corresponding to each CSI (used to generate each CSI) are high (that is, drops CSI of low priority).

For example, a case where SMR indices are prioritized over IMR indices, the priorities of SMR indices are set high in the order of SMR 1>SMR 2, and the priorities of IMR indices are set high in the order of IMR 2>IMR 1>IMR 3, is illustrated in FIG. 7C. In this case, first, CSI 3, with which the priority assigned to the SMR is low, is dropped, and, next, between CSI 1 and CSI 2 having the same SMR index, CSI 2, in which the priority assigned to the IMR is low, is dropped. As a result, CSI 1 is selected as feedback CSI. CSI 1 that is selected is fed back from the user terminal to the radio base station via the PUCCH (for example, in PUCCH format 2).

Also, a case where IMR indices are prioritized over SMR indices, the priorities of SMR indices are set high in the order of SMR 1>SMR 2, and the priorities of IMR indices are set high in the order of IMR 2>IMR 1>IMR 3 is shown in FIG. 7D. In this case, CSI 2, in which the priority assigned to the IMR is the lowest, is dropped, and, next, CSI 1, in which the priority assigned to the IMR is low, is dropped. As a result, CSI 3 is selected as feedback CSI. CSI 3 that is selected is fed back from the user terminal to the radio base station via the PUCCH (for example, in PUCCH format 2).

In this way, with the feedback CSI selection method upon coordinated multi-point transmission, feedback CSI is selected based on the priorities assigned to the indices of each piece of information (SMR, IMR and so on) that is used to generate each CSI, so that it is possible to effectively reduce the collisions of CSI.

<When CoMP is Applied/CA is Applied>

When coordinated transmission and carrier aggregation are applied, cases might occur where the priorities assigned to each piece of information (SMR, IMR, UE emulation, NZP CSI-RS and so on) that is used to generate each CSI become the same between CSIs of different CCs. Consequently, when coordinated transmission and carrier aggregation are both applied, the priorities that are assigned to the cell indices are taken into account, in addition to each piece of information (SMR, IMR, UE emulation, NZP CSI-RS and so on) that is used to generate each CSI.

FIG. 8 shows a case where, in a given subframe, CSI-RSs (desired signal estimation CSI-RSs and interference signal estimation CSI-RSs) are transmitted from transmission points (TP #1 and TP #2) where the same frequency (frequency 1) is used, and from a transmission point (TP #3) where a different frequency (frequency 2) from frequency 1 is used. To be more specific, a case is shown here where TP #1 and TP #2 serve as a CoMP set, and carrier aggregation is applied to TP #1 and TP #3.

When a user terminal generates CSI by applying a plurality of SMRs and a plurality of IMRs that are configured in each transmission point (when emulation is not employed), the user terminal selects feedback CSI based on the priorities assigned to the resource indices of CSI-RSs (SMR indices and/or IMR indices) corresponding to each CSI and the cell indices. To be more specific, as shown in FIG. 9, feedback CSI is selected (CSI that is not fed back is dropped) based on the priorities assigned to the cell indices, the SMR indices and the IMR indices.

Also, when one SMR and a plurality of IMRs are placed in multiple transmission points, feedback CSI is selected based on the priorities assigned to the cell indices and the IMR indices, and, when a plurality of SMRs and one IMR are placed, feedback CSI is selected based on the priorities assigned to the cell indices and the SMR indices.

When the user terminal carries out emulation to indirectly measure different interferences using SMRs and IMRs (when emulation is employed), the user terminal selects feedback CSI based on the priorities assigned to the cell indices, the SMR indices, the IMR indices and the index of the non-zero power CSI-RS to use in emulation. Alternatively, the user terminal selects feedback CSI based on the priorities assigned to the cell indices, the SMR indices and the UE emulation index.

That is, when coordinated transmission and carrier aggregation are both applied, a configuration may be employed in which cell indices are added to the target to assign priorities to shown in FIG. 6 above.

Next, an example of a feedback CSI selection method (CSI dropping and reporting), when coordinated multi-point transmission/reception and carrier aggregation are applied, will be described with reference to FIG. 10. Note that FIG. 10 shows a case where channel state measurement reference signals (desired signal estimation CSI-RSs and interference signal estimation CSI-RSs) are transmitted from three transmission points (TP #1 to TP #3) (see FIG. 8). That is, as noted earlier, TP #1 and TP #2 serve as a CoMP set, and carrier aggregation is applied to TP #1 and TP #3.

Also, FIG. 10 shows a case where the user terminal generates CSI 1 and CSI 2 for TP #1 (cell index: 0), CSI 3 and CSI 4 for TP #2 (cell index: 2), and CSI 5 for TP #3 (cell index: 1). CSIs 1 to 4 in FIG. 10A have the same contents as CSIs 1 to 4 shown in FIG. 5B and FIG. 7A. Also, CSI 5 (SMR 1/IMR 1) is equivalent to the channel quality of TP #3 upon single-cell transmission in the event of PUCCH report type 4 and wideband CQI.

First, the user terminal selects CSI with which the priority of the PUCCH report type is high, from a plurality of kinds of CSIs (here, CSI 1 to CSI 5) (that is, drops CSI of low priority). Here, the priority of PUCCH report type 1 is lower than that of PUCCH report type 4, and therefore CSI 4 is dropped (see FIG. 10B).

Next, the user terminal selects CSI with which the priorities of the resource indices of the CSI-RSs (IMR/SMR indices) corresponding to each CSI (used to generate each CSI) and cell indices are high (that is, drops CIS of low priority) from the rest of the CSIs (CSI 1, CSI 2, CSI 3 and CSI 5).

For example, a case is shown in FIG. 10C where priorities are assigned in the order of cell indices>SMR indices>IMR indices, the priorities of SMR indices are set high in the order of SMR 1>SMR 2, and the priorities of IMR indices are set high in the order of IMR 2>IMR 1>IMR 3. As for the cell indices, smaller cell indices are assigned higher priorities.

In this case, first, CSI 3, in which the priority assigned to the cell index is low, is dropped, and, next, CSI 5, in which the priority of the cell index is low, is dropped. CSI 1 and CSI 2 having the same cell index have the same SMR index, and therefore the decision is made based on the IMR indices. Here, CSI 2, in which the priority assigned to the IMR is low, is dropped. As a result, CSI 1 is selected as feedback CSI. CSI 1 that is selected is fed back from the user terminal to the radio base station via the PUCCH (for example, in PUCCH format 2).

In this way, with the feedback CSI selection method for when coordinated multi-point transmission/reception and carrier aggregation are applied, feedback CSI is selected based on the priorities assigned to the indices of each piece of information (SMR, IMR and so on) that is used to generate each CSI and to the cell indices, so that it is possible to effectively reduce the collisions of CSI.

Second Example

A case will be described here with a second example where feedback CSI is selected based on the priorities assigned to the combinations of the indices of each piece of information (SMR, IMR, UE emulation, NZP CSI-RS and so on) that is used to generate each CSI, from a plurality of kinds of CSIs generated in a user terminal. Note that parts that are different from the first example will be described in the following description, and, as for parts where the first example can be applied, reference may be made to the description given above.

<When CoMP is Applied/CA is not Applied>

When a user terminal generates CSI by applying SMRs and IMRs configured in each transmission point (when emulation is not employed), the user terminal selects feedback CSI based on the priorities assigned to the combinations of the resource indices of the CSI-RSs corresponding to each CSI. To be more specific, as shown in FIG. 11, when a plurality of SMRs and IMRs are configured in a plurality of transmission points that serve as a CoMP set (see above FIG. 3B), the user terminal selects feedback CSI based on the priorities assigned to one or a plurality of combinations of SMR indices and IMR indices. In this case, it is possible to assign new indices to the combinations of SMR indices and IMR indices and assign priorities to these indices.

Also, since the combinations of SMR indices and IMR indices can be represented by CSI indices, it is then possible to assign priorities to the CSI indices and control the selection of feedback CSI.

When the user terminal carries out emulation to indirectly measure other interferences using SMRs and IMRs (when emulation is employed), the user terminal can select feedback CSI based on the priorities assigned to one or a plurality of combinations of SMR indices and IMR indices and the index of the non-zero power CSI-RS to use in emulation. Alternatively, the user terminal may select feedback CSI based on the priorities assigned to the combinations of SMR indices and UE emulation index.

Also, since the combinations of SMR indices and UE emulation index can be represented by CSI indices, it is then possible to assign priorities to the CSI indices and control the selection of feedback CSI.

Information about indices, including the combinations of various indices such as SMR indices, IMR indices, the index of the non-zero power CSI-RS that is used in emulation, the UE emulation index and so on may be sent by means of, for example, broadcast signals (such as master information blocks (MIBs) that are transmitted using a physical broadcast channel, system information blocks (SIBs) that are multiplexed on a data channel, and so on), or may be reported from the radio base station to the user terminal by means of higher layer signaling, RRC signaling, medium access control (MAC) signals, or downlink control information.

Also, the radio base station can assign priorities to the combinations of the indices of each piece of information that is used to generate each CSI, and report these to the user terminal. For example, as the priorities to assign to the combinations of the indices of each piece of information that is used to generate each CSI, the radio base station assigns higher priorities to indices combining information that is used to generate CSI for single-cell transmission. This is because, generally, CSI in single-cell transmission is more important than CSI in coordinated transmission.

Next, an example of a feedback CSI selection method (CSI dropping and reporting) upon coordinated multi-point transmission will be described with reference to FIG. 12. Note that FIG. 12 shows a case where channel state measurement reference signals (desired signal estimation CSI-RSs and interference signal estimation CSI-RSs) are transmitted from two transmission points (TP #1 and TP #2) that serve as a CoMP set (see FIG. 5A).

Also, FIG. 12 shows a case where a user terminal generates plurality of kinds of channel state information (for example, CSI 1 to CSI 4) based on a plurality of SMRs 1 and 2 and IMRs 1 to 3. Note that CSIs 1 to 4 in FIG. 12 have the same contents as CSIs 1 to 4 shown in FIG. 5B, FIG. 7A and so on.

First, the user terminal selects CSI with which the priority of the PUCCH report type is high, from a plurality of kinds of CSIs (here, CSI 1 to CSI 4) (that is, drops CSI of low priority). Here, the priority of PUCCH report type 1 is lower than that of PUCCH report type 4, and therefore CSI 4 is dropped (see FIG. 12B).

Next, the user terminal selects CSI, in which the priority assigned to the combination of the resource indices of the CSI-RSs (IMR/SMR indices) corresponding to each CSI (used to generate each CSI) is high, from the rest of the CSIs (CSI 1, CSI 2 and CSI 3) (that is, drops CSI of low priority).

For example, a case where the priorities of the combinations of SMR indices and IMR indices (SMR/IMR) are set high in the order of SMR 1/IMR 1>SMR 2/IMR 2>SMR 1/IMR 3 is shown in FIG. 12C. For example, indices 0, 1 and 2 are assigned to the combinations SMR 1/IMR 1, SMR 2/IMR 2 and SMR 1/IMR 3 such that the smaller indices have higher priorities. In this case, CSI 2, in which the priority assigned to the combination of SMR and IMR indices is the lowest, is dropped. Next, with the rest of CSI 1 (SMR 1/IMR 1) and CSI 3 (SMR 2/IMR 2), CSI 1 has the higher priority. However, since a case is assumed here where CSI is fed back via PUCCH format 3 having large capacity, both CSI 1 and CSI 3 are fed back. Note that the user terminal may determine the order, arrangement and so on of allocation to the PUCCH based on the priorities.

Note that the priorities of the combinations of SMR and IMR indices can be assigned from various perspectives. For example, priorities may be assigned based on one of IMRs and SMRs. Furthermore, it is also possible to assign indices to all the combinations of SMRs and IMRs and assign priorities.

Figure 13A:
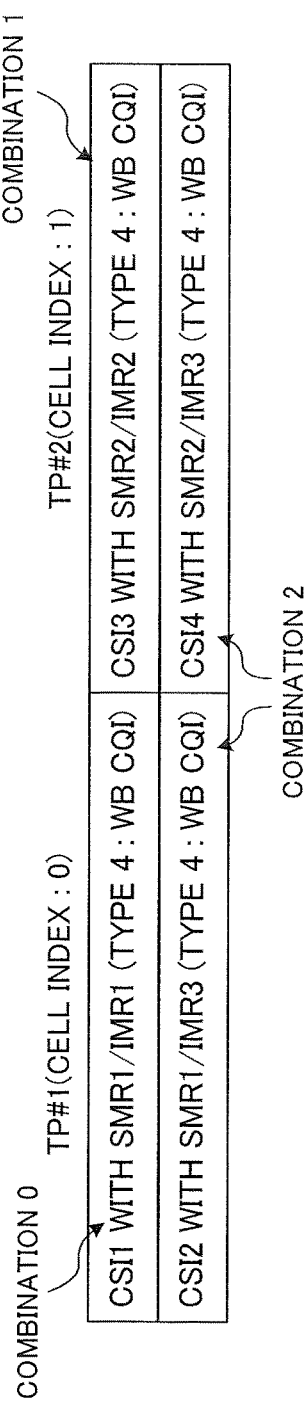
FIG. 13 provides diagrams to explain another example of a feedback CSI selection method (CSI dropping and reporting) for when CoMP is applied/CA is not applied according to the second example.

In above FIG. 12, the priorities of the combinations of SMR and IMR indices are set such that, based on the IMRs, the priority become higher in the order of IMR 1>IMR 2>IMR 3. In this case, the priority of the combination of the SMR and IMR indices becomes the same in CSIs (CSI 2 and CSI 4) having the same IMR index (IMR 3). Consequently, in FIG. 12, if CSI 4 is formed with a wideband CQI (see FIG. 13A), the priority of the PUCCH report type and the priority of SMR/IMR become the same with respect to CSI 2 and CSI 4.

Consequently, as another example of a feedback CSI selection method upon coordinated multi-point transmission, when priorities are assigned to the combinations of SMR and IMR indices, in a group in which the same priority is assigned to the combinations, a candidate may be selected in advance based on predetermined standards. For example, after one CSI is selected based on predetermined priorities (for example, the priorities of the PUCCH report types, the cell indices, and so on) for every group in which the priority of the combination of SMR and IMR indices is the same, it is possible to employ the priority of the combination of SMR and IMR indices. This case will be described with reference to FIG. 13.

The user terminal first classifies a plurality of CSIs based on the priorities of the combinations of SMR and IMR indices (SMR/IMR). For example, for SMR/IMR, when the combination of SMR 1/IMR 1 (combination 0), the combination of SMR 2/IMR 2 (combination 1), and the combination of SMR 1 or SMR 2/IMR 3 (combination 2) are assigned priorities separately, it is possible to classify CSI 1 as combination 0, CSI 3 as combination 1, and CSI 2 and CSI 4 as combination 2. When SMR/IMR is represented by CSI indices, it is possible to classify CSI 1 as combination 0, CSI 2 and CSI 4 as combination 2, and CSI 3 as combination 1.

Figure 13B:
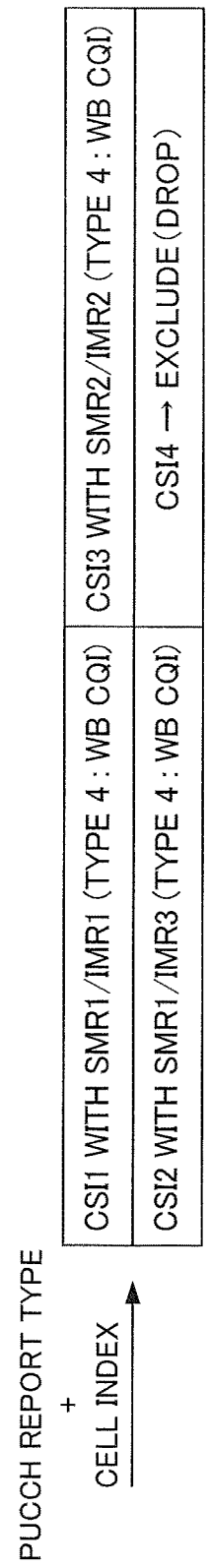
Figure 13C:
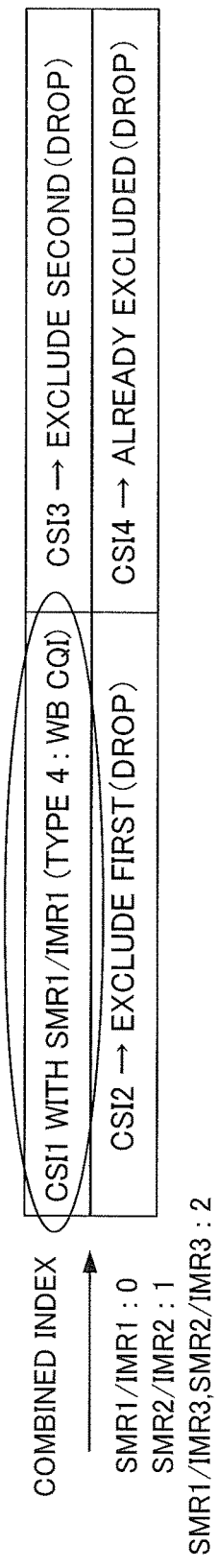

Next, the user terminal selects CSI, for every classified combination, based on the priorities assigned to the PUCCH report types and the priorities assigned to the cell indices. In FIG. 13, a plurality of CSIs are present in combination 2, so that one of CSI 2 and CSI 4 is selected based on the priorities assigned to the PUCCH report types and the cell indices. Although the priority of the PUCCH report type is the same between CSI 2 and CSI 4, CSI 2 has the higher cell index priority, and therefore CSI 4 is dropped (see FIG. 13B). As a result of this, one CSI is selected from each combination.

Next, the user terminal selects feedback CSI based on the priorities of the combinations of SMR and IMR indices, with respect to CSI 1, CSI 2 and CSI 3, similar to FIG. 12 above. Here, CSI 1 of the highest priority is selected, and fed back from the user terminal to the radio base station via the PUCCH (for example, in PUCCH format 2).

In this way, by classifying a plurality of CSIs based on the priorities assigned to the combinations of SMR and IMR indices and making selections, with respect to the groups of the classified combinations, based on the priorities assigned to the PUCCH report types and the cell indices, it is possible to assign priorities to a plurality of CSIs adequately. Note that although combinations of SMR indices and IMR indices have been described here, the present invention is equally applicable to combinations of other indices as well.

<When CoMP is Applied/CA is Applied>

When coordinated transmission and carrier aggregation are applied, cases might occur where the priorities assigned to the combinations of the indices of each piece of information (SMR, IMR, UE emulation, NZP CSI-RS and so on) that is used to generate each CSI become the same in CSIs of different CCs. Consequently, when coordinated transmission and carrier aggregation are both applied, the priorities assigned to the cell indices are also taken into account, in addition to the indices of each piece of information (SMR, IMR, UE emulation, NZP CSI-RS and so on) that is used to generate each CSI.

To be more specific, in addition to the combinations of the indices of each piece of information (SMR, IMR, UE emulation, NZP CSI-RS and so on) that is used to generate each CSI, which are taken into account in above <when CoMP is applied/CA is not applied>, cell indices are also incorporated. That is, when coordinated transmission and carrier aggregation are both applied, a configuration may be employed in which cell indices are additionally incorporated in the target to assign priorities to, shown in FIG. 11 above. For example, when UE emulation is not applied, priorities are assigned to the combinations of SMR indices, IMR indices and cell indices (or the combinations of CSI indices and cell indices).

Next, an example of a feedback CSI selection method (CSI dropping and reporting), when coordinated multi-point transmission/reception and carrier aggregation are applied, will be described with reference to FIG. 14. Note that FIG. 14 illustrates a case where channel state measurement reference signals (desired signal estimation CSI-RSs and interference signal estimation CSI-RSs) are transmitted from three transmission points (TP #1 to TP #3) (see FIG. 8). That is to say, TP #1 and TP #2 serve as a CoMP set, and carrier aggregation is applied to TP #1 and TP #3.

Also, FIG. 14 shows a case where the user terminal generates CSI 1 and CSI 2 for TP #1 (cell index: 0), CSI 3 and CSI 4 for TP #2 (cell index: 2), and CSI 5 for TP #3 (cell index: 1). Also, CSIs 1 to 5 in FIG. 14A have the same contents as CSIs 1 to 5 shown in FIG. 10 above.

First, the user terminal selects CSI with which the priority of the PUCCH report type is high, from a plurality of kinds of CSIs (here, CSI 1 to CSI 5) (that is, drops CSI of low priority). Here, the priority of PUCCH report type 1 is lower than that of PUCCH report type 4, and therefore CSI 4 is dropped (see FIG. 14B).

Next, the user terminal selects CSI, in which the priority assigned to the combination of the resource indices of the CSI-RSs (IMR/SMR indices) corresponding to each CSI (used to generate each CSI) and the cell index is high, from the rest of the CSIs (CSI 1, CSI 2 and CSI 3) (that is, drops CSI of low priority).

For example, a case where the priorities of the combinations of the cell index, the SMR index and the IMR index (TP/SMR/IMR) are set high in the order of TP 1/SMR 1/IMR 1>TP 3/SMR 1/IMR 1>TP 1/SMR 1/IMR 3>TP 2/SMR 2/IMR 2 is shown in FIG. 14C.

In this case, CSI 3, CSI 2 and CSI 5 of lower priorities are dropped in order, and CSI 1 is selected. CSI 1 that is selected is fed back from the user terminal to the radio base station via the PUCCH (for example, in PUCCH format 2).

In this way, with the feedback CSI selection method for when coordinated multi-point transmission/reception and carrier aggregation are applied, feedback CSI is selected based on the priorities assigned to the combinations of the indices of SMRs, IMRs and so on that are used to generate each CSI, and cell indices, so that it is possible to reduce the collisions of CSI effectively.

Note that the priorities of the combinations of SMR indices and IMR indices can be assigned from various perspectives. For example, priorities may be assigned based on one of IMRs and SMRs. Furthermore, it is also possible to assign indices to all combinations of SMRs and IMRs and assign priorities.

As another example of a feedback CSI selection method for when coordinated multi-point transmission/reception and CA are applied, it is possible to classify a plurality of CSIs based on the priorities of the combinations of SMR and IMR indices, select one CSI based on predetermined priority per group, and, after that, employ the priorities of the combination of cell indices and SMR/IMR indices. This case will be described with reference to FIG. 15.

The user terminal first classifies a plurality of CSIs based on the priorities of the combinations of SMR and IMR indices (SMR/IMR). For example, when priorities are assigned to the combination SMR 1/IMR 1 (combination 0), the combination of SMR 2/IMR 2 (combination 2) and the combination of SMR 1 or SMR 2/IMR 3 (combination 1), separately, CSI 1 (TP 1/SMR 1/IMR 1) and CSI 5 (TP 3/SMR 1/IMR 1) are classified as combination 0, CSI 3 (TP 2/SMR 2/IMR 2) is classified as combination 2, and CSI 2 (TP 1/SMR 1/IMR 3) and CSI 4 (TP 2/SMR 2/IMR 3) are classified as combination 1.

Figure 15A:
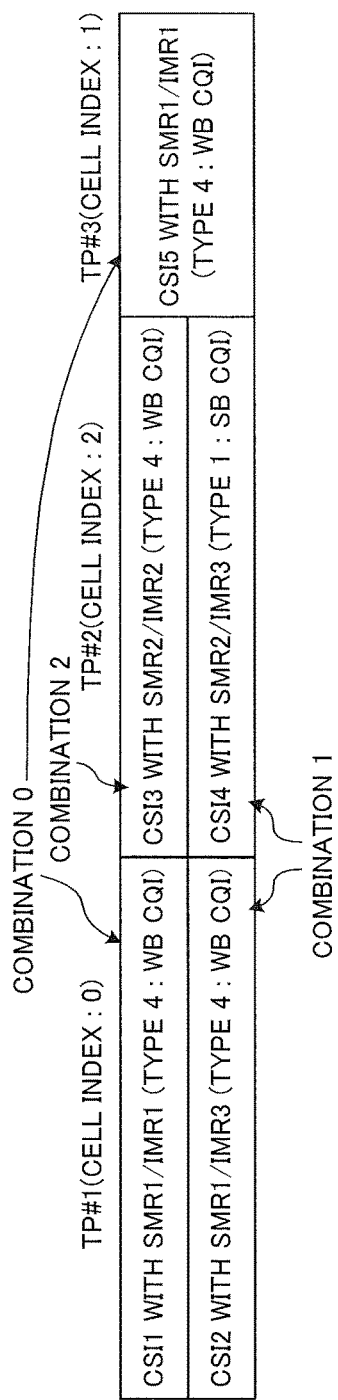
FIG. 15 provides diagrams to explain another example of a feedback CSI selection method (CSI dropping and reporting) for when CoMP is applied/CA is applied according to the second example.
Figure 15B:
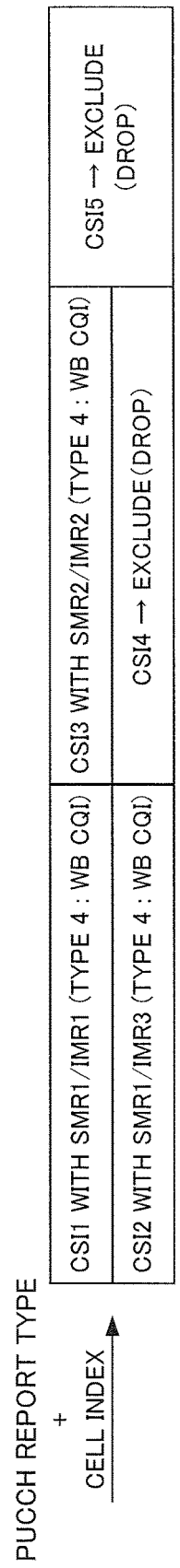
Figure 15C:
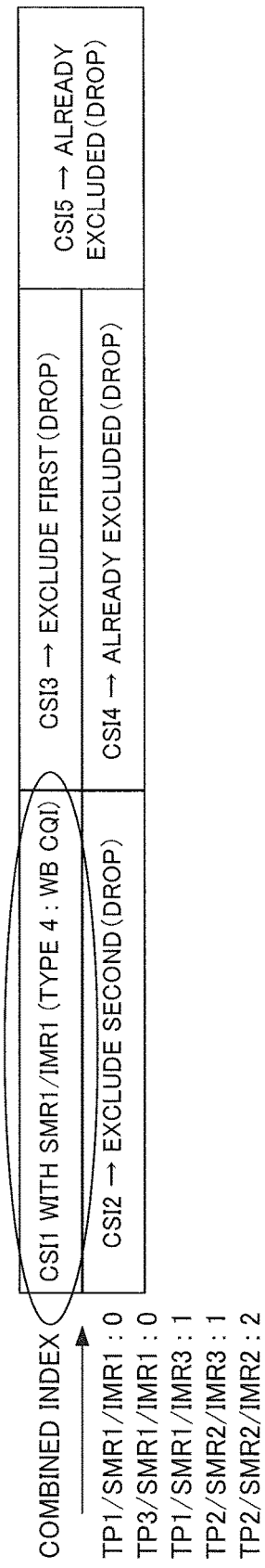

Next, the user terminal selects CSI per classified combination, based on the priorities assigned to the PUCCH report types and the priorities assigned to the cell indices. In FIG. 15, a plurality of CSIs are present in combination 0 and combination 1, so that, with respect to CSI 1/CSI 5 and CSI 2/CSI 4, one is selected based on the priorities assigned to the PUCCH report types and the cell indices. Although the priority of the PUCCH report type is the same between CSI 1 and CS 5, the cell index priority is higher with CSI 1, and therefore CSI 5 is dropped (see FIG. 15B). Also, between CSI 2 and CSI 4, the priority of the PUCCH report type is higher with CSI 2, and therefore CSI 4 is dropped (FIG. 15B). As a result of this, one CSI is selected from each combination.

Next, similar to FIG. 14 above, with respect to CSI 1, CSI 2 and CSI 3, the user terminal selects feedback CSI based on the priorities of the combinations of cell indices, SMR indices and IMR indices. Here, CSI 1 of the highest priority is selected and fed back from the user terminal to the radio base station via the PUCCH (for example, in PUCCH format 2).

In this way, a plurality of CSIs are classified based on the priorities of the combinations of cell indices, SMR indices and IMR indices, and, with respect to the groups of classified combinations, selections are made based on the priorities assigned to the PUCCH report types and the cell indices, so that it is possible to assign priorities to a plurality of CSIs adequately. Note that, although combinations of cell indices, SMR indices and IMR indices have been described here, the present invention is equally applicable to combinations of other indices as well.

Other Examples

As another example of the present embodiment, when a user terminal feeds back a plurality of CSIs via the PUSCH, it is possible to determine the order of placing the plurality of CSIs (the placing order of the plurality of CSIs) in the PUSCH based on the priorities of the CSIs according to the above first example or the second example.

As described above, the CSI to be fed back from the user terminal is time-multiplexed with the PUSCH when transmitted simultaneously with user data. In Rel.10, a study is in progress to follow the order of cell indices when feeding back a plurality of CSIs from varying transmission points via the PUSCH. However, how to feed back a plurality of CSIs from one transmission point via the PUSCH is not determined yet.

Consequently, here, when a plurality of CSIs are transmitted via the PUSCH, the order of placing the plurality of CSIs in the PUSCH is determined based on the priorities of the CSI defined according to the above first example. Alternatively, the order of placing a plurality of CSIs in the PUSCH may be determined based on the priorities of the CSI defined according to the above second example.

(Configuration of Radio Communication System)

Figure 16:
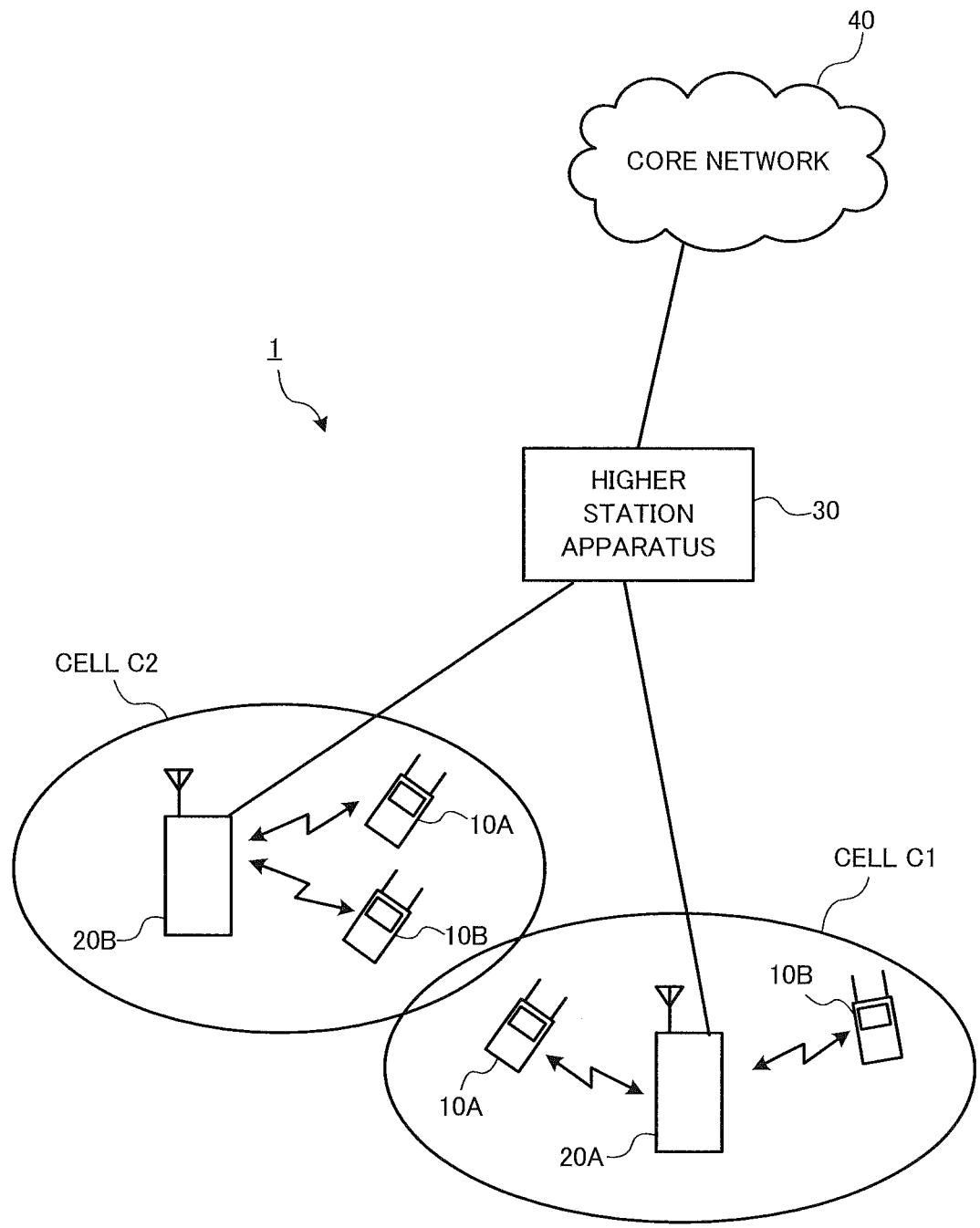
FIG. 16 is a diagram to explain a system configuration of a radio communication system.

Now, a radio communication system according to the present embodiment will be described in detail. FIG. 16 is a diagram to explain a system configuration of a radio communication system according to the present embodiment. Note that the radio communication system shown in FIG. 16 is a system to accommodate, for example, the LTE system or SUPER 3G. In this radio communication system, carrier aggregation is used to group a plurality of fundamental frequency blocks into one, where the system band of the LTE system is one unit. Also, this radio communication system may be referred to as "IMT-Advanced" or may be referred to as "4G."

As shown in FIG. 16, a radio communication system 1 is configured to include radio base stations 20A and 20B and a plurality of first and second user terminals 10A and 10B that communicate with these radio base stations 20A and 20B. The radio base stations 20A and 20B are connected with a higher station apparatus 30, and this higher station apparatus 30 is connected with a core network 40. Also, the radio base stations 20A and 20B are connected with each other by wire connection or by wireless connection. The first and second user terminals 10A and 10B are able to communicate with radio base stations 20A and 20B in cells C1 and C2. Note that the higher station apparatus 30 includes, for example, an access gateway apparatus, a radio network controller (RNC), a mobility management entity (MME) and so on, but is by no means limited to these. Note that, between cells, CoMP transmission is controlled by a plurality of base stations.

Although the first and second user terminals 10A and 10B include LTE terminals and LTE-A terminals, in the following description, these will be simply referred to as first and second user terminals, unless specified otherwise. Also, although, for ease of explanation, the first and second user terminals 10A and 10B will be described to perform radio communication with the radio base stations 20A and 20B, more generally, user equipment (UE) to include both mobile terminal apparatus and fixed terminal apparatus may be used as well.

In the radio communication system 1, as radio access schemes, OFDMA (Orthogonal Frequency Division Multiple Access) is applied to the downlink, and SC-FDMA (Single Carrier Frequency Division Multiple Access) is applied to the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing the system band into bands formed with one or continuous resource blocks per terminal, and allowing a plurality of terminals to use mutually different bands.

Downlink communication channels include a PDSCH, which is used by the first and second user terminals 10A and 10B on a shared basis as a downlink data channel, and downlink L1/L2 control channels (PDCCH, PCFICH, and PHICH). Transmission data and higher control information are transmitted by the PDSCH. PDSCH and PUSCH scheduling information and so on are transmitted by the PDCCH. The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH, which is used by each user terminal on a shared basis as an uplink data channel, and a PUCCH, which is an uplink control channel. By means of this PUSCH, transmission data and higher control information are transmitted. Also, by means of the PUCCH, channels state information (CSI) such as RIs, PMIs and CQIs, ACK/NACK and so on are transmitted.

An overall configuration of a radio base station according to the present embodiment will be described with reference to FIG. 17. Note that the radio base stations 20A and 20B are configured alike and therefore will be described as "radio base station 20." Also, the first and second user terminals 10A and 10B, which will be described later, are configured alike and therefore will be described as "user terminal 10."

The radio base station 20 includes transmitting/receiving antennas 201, amplifying sections 202, transmitting/receiving sections (reporting sections) 203, a baseband signal processing section 204, a call processing section 205, and a transmission path interface 206. Transmission data to be transmitted from the radio base station 20 to the user terminal on the downlink is input from the higher station apparatus 30, into the baseband signal processing section 204, via the transmission path interface 206.

In the baseband signal processing section 204, a downlink data channel signal is subjected to a PDCP layer process, division and coupling of transmission data, RLC (Radio link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

Also, the baseband signal processing section 204 reports control information for allowing each user terminal 10 to perform radio communication with the radio base station 20, to the user terminals 10 connected to the same cell, by a broadcast channel. The information for allowing communication in the cell includes, for example, the uplink or downlink system bandwidth, root sequence identification information (root sequence indices) for generating random access preamble signals in the PRACH (Physical Random Access Channel), and so on.

Baseband signals that are output from the baseband signal processing section 204 are converted into a radio frequency band in the transmitting/receiving sections 203. The amplifying sections 202 amplify the radio frequency signals having been subjected to frequency conversion, and output the results to the transmitting/receiving antennas 201. Note that the transmitting/receiving sections 203 constitute a receiving means to receive uplink signals including information such as phase differences between multiple cells and PMIs, and a transmitting means to transmit transmission signals by coordinated multi-point transmission. Also, the transmitting/receiving sections 203 function as a reporting section when reporting candidate inter-cell CSI candidate values from the radio base station to the user terminal.

Meanwhile, as for signals to be transmitted from the user terminal 10 to the radio base station 20 on the uplink, radio frequency signals that are received in the transmitting/receiving antennas 201 are amplified in the amplifying sections 202, converted into baseband signals through frequency conversion in the transmitting/receiving sections 203, and input in the baseband signal processing section 204.

The baseband signal processing section 204 performs an FFT process, an IDFT process, error correction decoding, a MAC retransmission control receiving process, and RLC layer and PDCP layer receiving processes of the transmission data that is included in the baseband signals received on the uplink. The decoded signals are transferred to the higher station apparatus 30 through the transmission path interface 206.

The call processing section 205 performs call processing such as setting up and releasing communication channels, manages the state of the radio base station 20 and manages the radio resources.

Figure 17:
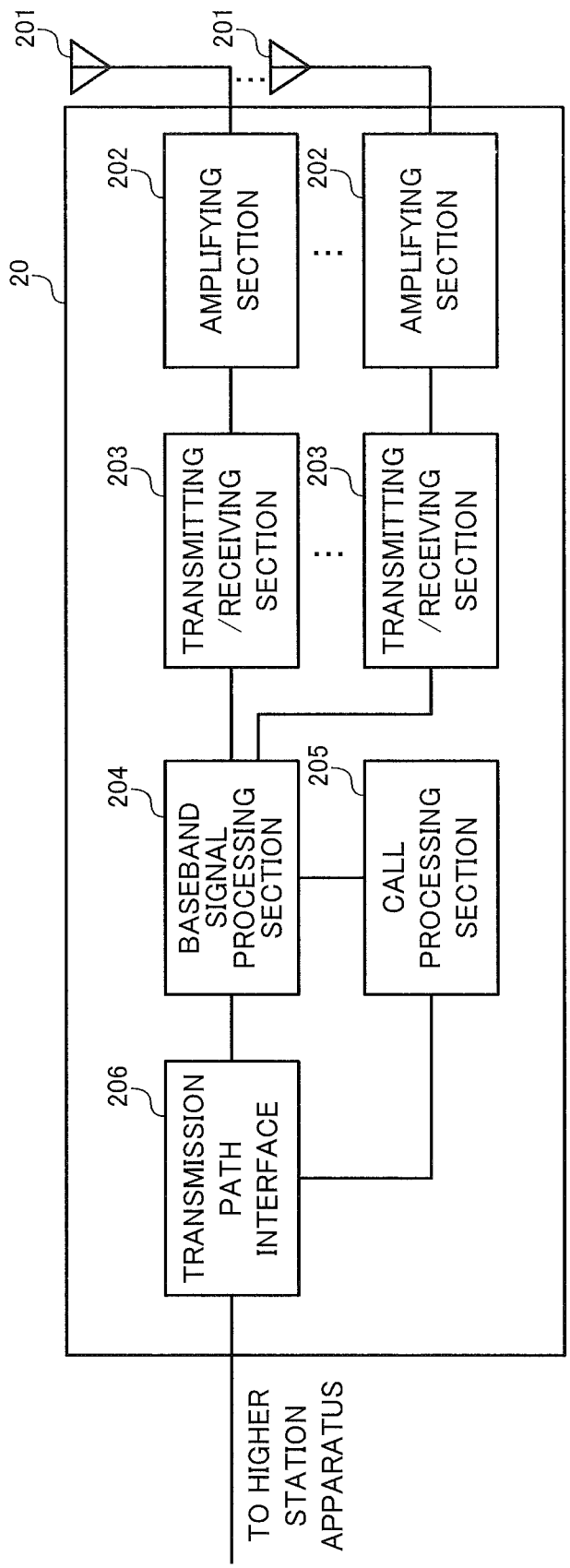
FIG. 17 is a diagram to explain an overall configuration of a radio base station.
Figure 18:
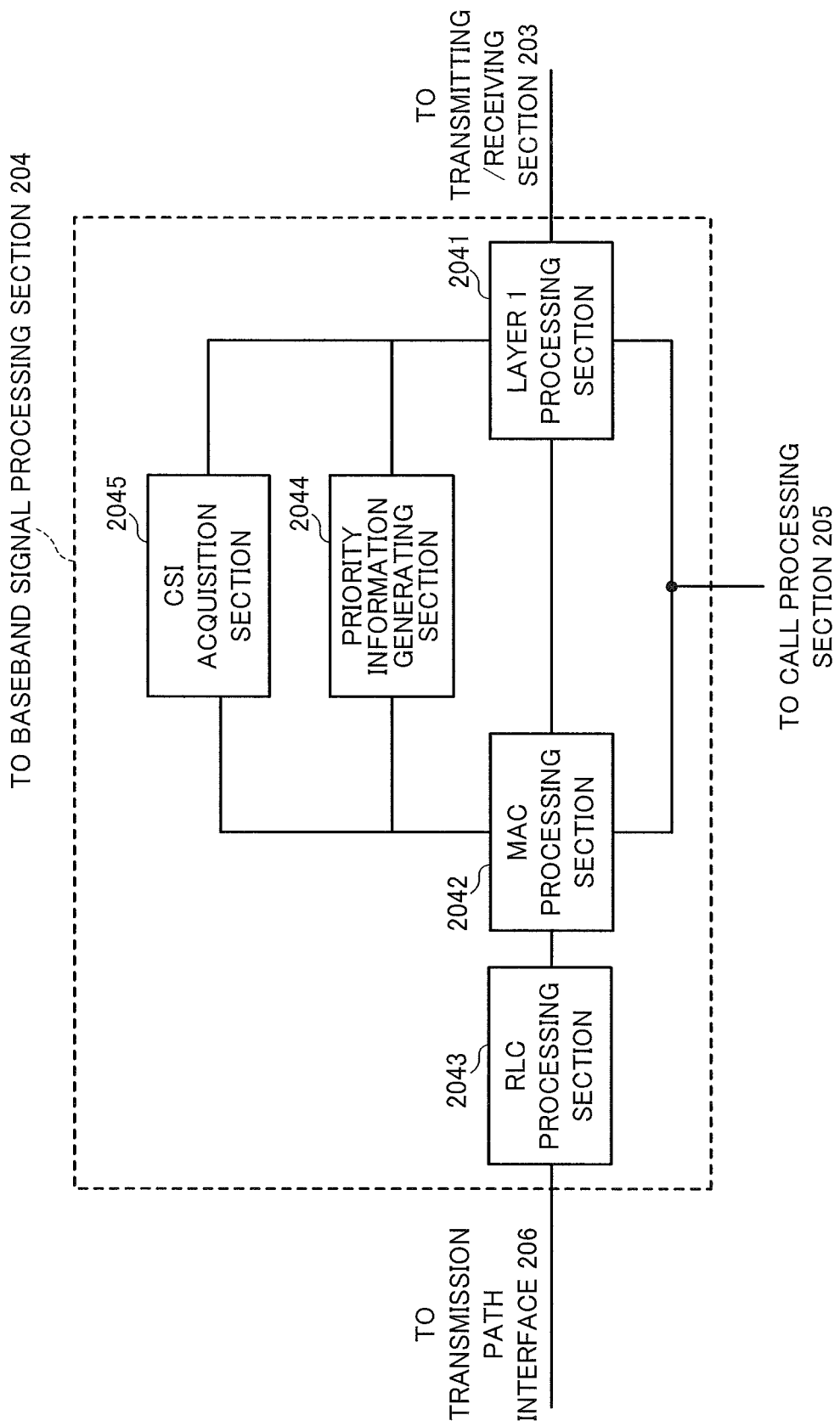
FIG. 18 is a functional block diagram corresponding to a baseband processing section of a radio base station.

FIG. 18 is a block diagram to show a configuration of a baseband signal processing section in the radio base station shown in FIG. 17. The baseband signal processing section 204 is primarily formed with a layer 1 processing section 2041, a MAC processing section 2042, an RLC processing section 2043, a priority information generating section 2044, and a CSI acquisition section 2045.

The layer 1 processing section 2041 mainly performs processes related to the physical layer. For example, the layer 1 processing section 2041 applies processes to signals received on the uplink, including channel decoding, a discrete Fourier transform (DFT), frequency demapping, an inverse fast Fourier transform (IFFT), data demodulation and so on. Also, the layer 1 processing section 2041 performs processes for signals to transmit on the downlink, including channel coding, data modulation, frequency mapping and an inverse fast Fourier transform (IFFT) and so on.

The MAC processing section 2042 performs processes for signals that are received on the uplink, including MAC layer retransmission control, scheduling for the uplink/downlink, transport format selection for the PUSCH/PDSCH, resource block selection for the PUSCH/PDSCH, and so on.

The RLC processing section 2043 performs, for packets that are received on the uplink/packets to transmit on the downlink, packet division, packet coupling, RLC layer retransmission control and so on.

The CSI acquisition section 2045 acquires each cell's CSI fed back from the user terminal through the PUCCH and so on. The CSI that is fed back from the user terminal via the PUCCH is selected based on the priorities assigned to the indices of each piece of information (SMR, IMR, UE emulation, NZP CSI-RS and so on) that is used to generate each CSI, in order to prevent collisions.

The priority information generating section 2044 assigns priorities to the indices of each piece of information (SMR, IMR, UE emulation, NZP CSI-RS and so on) that is used to generate CSI, to select feedback CSI from a plurality of kinds of CSIs generated in the user terminal. Information about the indices to which priorities are assigned may be sent by means of, for example, broadcast signals (such as master information blocks (MIBs) that are transmitted using a physical broadcast channel, system information blocks (SIBS) that are multiplexed on a data channel, and so on), or may be reported from the radio base station to the user terminal by means of higher layer signaling, RRC signaling, medium access control (MAC) signals, or downlink control information.

Next, an overall configuration of a user terminal according to the present embodiment will be described with reference to FIG. 19. An LTE terminal and an LTE-A terminal have the same hardware configurations in principle parts, and therefore will be described indiscriminately. A user terminal 10 has transmitting/receiving antennas 101, amplifying sections 102, transmitting/receiving sections (receiving sections) 103, a baseband signal processing section 104, and an application section 105.

As for downlink data, radio frequency signals that are received in the transmitting/receiving antennas 101 are amplified in the amplifying sections 102, and converted into baseband signals through frequency conversion in the transmitting/receiving sections 103. The baseband signals are subjected to an FFT process, error correction decoding, a retransmission control receiving process and so on in the baseband signal processing section 104. In this downlink data, downlink transmission data is transferred to the application section 105. The application section 105 performs processes related to higher layers above the physical layer and the MAC layer, and so on. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. Baseband signals that are output from the baseband signal processing section 104 are converted into a radio frequency band in the transmitting/receiving sections 103. After that, the amplifying sections 102 amplify the radio frequency signals having been subjected to frequency conversion, and transmit the results from the transmitting/receiving antennas 101. Note that the transmitting/receiving sections 103 constitute a transmitting means to transmit information about phase differences, information about connecting cells, selected PMIs and so on, to the radio base station apparatus eNBs of multiple cells, and a receiving means to receive downlink signals.

Figure 19:
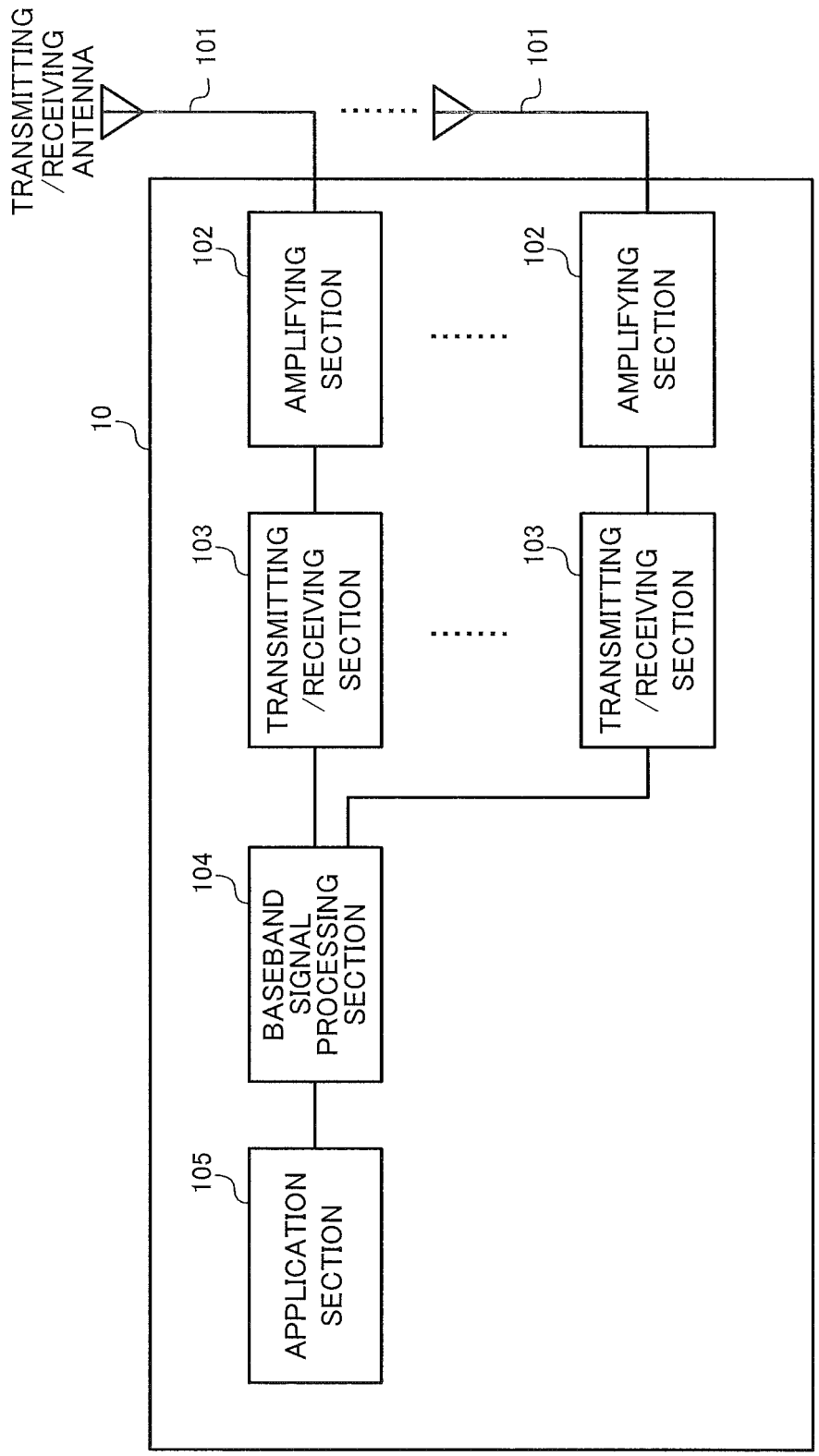
FIG. 19 is a diagram to explain an overall configuration of a user terminal.
Figure 20:
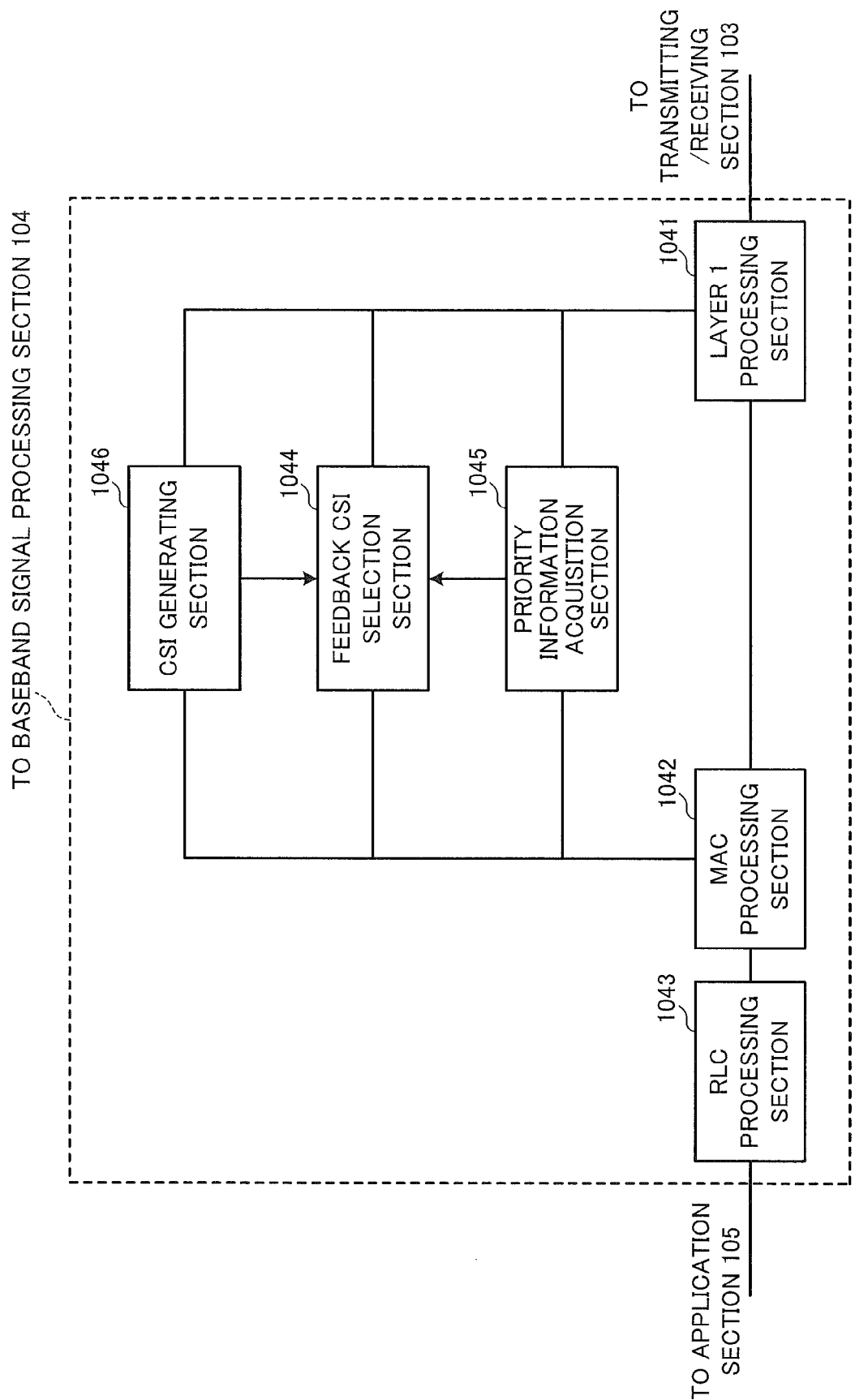
FIG. 20 is a functional block diagram corresponding to a baseband processing section of a user terminal.

FIG. 20 is a block diagram to show a configuration of a baseband signal processing section in the user terminal shown in FIG. 19. The baseband signal processing section 104 is primarily formed with a layer 1 processing section 1041, a MAC processing section 1042, an RLC processing section 1043, a feedback CSI selection section 1044, a priority information acquisition section 1045, and a CSI generating section 1046.

The layer 1 processing section 1041 mainly performs processes related to the physical layer. The layer 1 processing section 1041, for example, performs processes for a signal that is received on the downlink, including channel decoding, a discrete Fourier transform (DFT), frequency demapping, an inverse fast Fourier transform (IFFT), data demodulation and so on. Also, the layer 1 processing section 1041 performs processes for a signal to transmit on the uplink, including channel coding, data modulation, frequency mapping, an inverse Fourier transform (IFFT), and so on.

The MAC processing section 1042 performs, for a signal that is received on the downlink, MAC layer retransmission control (HARQ) and an analysis of downlink scheduling information (specifying the PDSCH transport format, specifying the PDSCH resource blocks and so on), and so on. Also, the MAC processing section 1042 performs, for a signal to transmit on the uplink, MAC retransmission control and an analysis of uplink scheduling information (specifying the PUSCH transport format, specifying the PUSCH resource blocks and so on), and so on.

The RLC processing section 1043 performs, for packets received on the downlink/packets to transmit on the uplink, packet division, packet coupling, RLC layer retransmission control and so on.

The CSI generating section 1046 generates a plurality of kinds of channel state information (CSI) using channel state measurement reference signals transmitted from each transmission point (desired signal estimation CSI-RS and interference signal estimation CSI-RS). For example, as shown in above FIG. 3, based on the SMRs and IMRs placed in each transmission point, CSI upon single-cell transmission, CSI upon CoMP transmission and so on are generated.

The priority information acquiring section 1045 acquires information about the priorities assigned to the indices of each piece of information (SMR, IMR, UE emulation, NZP CSI-RS and so on) that is used to generate CSI, the cell indices, the CSI indices, or combinations of these. When the radio base station determines the priority of each piece of information, information about the indices to which priorities are assigned is reported from the radio base station to the user terminal by means of, for example, broadcast signals (such as master information blocks (MIBs) that are transmitted using a physical broadcast channel, system information blocks (SIBs) that are multiplexed on a data channel, and so on), higher layer signaling, RRC signaling, medium access control (MAC) signals, or downlink control information.

The feedback CSI selection section 1044 selects predetermined CSI to feed back from a plurality of kinds of CSIs generated, based on the priority information from the priority information acquiring section 1045.

When the above first example is applied, the feedback CSI selection section 1044 selects feedback CSI from a plurality of kinds of CSIs generated in the CSI generating section 1046, based on the priorities assigned to the indices of each piece of information (SMR, IMR, UE emulation, NZP CSI-RS and so on) that is used to generate each CSI.

When the above second example is applied, the feedback CSI selection section 1044 selects feedback CSI from a plurality of kinds of CSIs generated in the CSI generating section 1046, based on the priorities assigned to the combinations of the indices of each piece of information (SMR, IMR, UE emulation, NZP CSI-RS and so on) that is used to generate each CSI.

The CSI selected in the feedback CSI selection section 1044 is fed back to the radio base station via the PUCCH.

Although the present invention has been described in detail using the above embodiments, the present invention is by no means limited to the above embodiments and can be implemented with various changes. For example, without departing from the scope of the present invention, it is possible to apply various changes with respect to the positions where CSI-RSs are set, the positions where muting (zero power) is set, the number of processing sections, the order of processing steps, the number of CSI-RSs, the number of muting and the number of transmission points, and implement the present invention. Also, although cases have been described above where a plurality of transmission points are a plurality of radio base stations, a transmission point may be an antenna as well. Besides, the present invention can be implemented with various changes, without departing from the scope of the present invention.

The disclosure of Japanese Patent Application No. 2012-143456, filed on Jun. 26, 2012, including the specification, drawings and abstract, is incorporated herein by reference in its entirety.

The invention claimed is:

1. A user terminal comprising:
   a generating section that generates multiple channel state information (CSI) using channel state information reference signals (CSI-RSs) transmitted from transmission points supporting coordinated multi-point transmission;
   a selection section that selects given CSI to feed back, from the multiple CSI; and
   a transmission section that feeds back the given CSI via an uplink control channel (PUCCH),
   wherein the selection section selects the given CSI based at least on resource indices of the CSI-RSs corresponding to the multiple CSI.

2. The user terminal according to claim 1, wherein the selection section uses at least a desired signal measurement resource (SMR) index and/or an interference signal measurement resource (IMR) index as the resource indices of the CSI-RSs corresponding to the multiple CSI.

3. The user terminal according to claim 1, wherein, when the user terminal is configured with a plurality of cells and the resource indices of the CSI-RSs corresponding to the multiple CSI are same, the selection section selects the given CSI to feed back, based on cell indices.

4. The user terminal according to claim 1, wherein, when the user terminal is configured with a plurality of cells, the selection section drops CSI of low priority from the multiple CSI based on priorities assigned to PUCCH report types of the multiple CSI, and when the priorities assigned to the PUCCH report types of the multiple CSI are same, the selection section selects the given CSI based on the resource indices of the CSI-RSs.

5. The user terminal according to claim 1, wherein information about the resource indices of the CSI-RSs corresponding to the multiple CSI is given to the user terminal by higher layer signaling.

6. The user terminal according to claim 1, wherein the selection section uses, as the resource indices of the CSI-RSs corresponding to the multiple CSI, indices assigned to combinations of one or a plurality of desired signal measurement resource (SMR) indices and one or a plurality of interference signal measurement resource (IMR) indices.

7. A user terminal comprising:
a generating section that generates multiple channel state information (CSI) using channel state information reference signals (CSI-RSs) transmitted from transmission points supporting coordinated multi-point transmission; and
a transmission section that feeds back the multiple CSI via an uplink shared channel (PUSCH),
wherein the transmission section controls an order of placing the multiple CSI to the PUSCH based at least on resource indices of the CSI-RSs corresponding to the multiple CSI.

8. A radio communication system comprising a radio base station supporting coordinated multi-point transmission and a user terminal connected to the radio base station,
the radio base station comprising:
a transmission section that transmits, to the user terminal, a channel state information reference signal (CSI-RS) and information about a resource index; and
a receiving section that receives given channel state information (CSI) fed back from the user terminal via an uplink control channel (PUCCH), and
the user terminal comprising:
a generating section that generates multiple CSI using CSI-RSs;
a selection section that selects the given CSI to feed back from the multiple CSI; and
a transmission section that feeds back the given CSI via the PUCCH,
wherein the selection section selects the given CSI based at least on resource indices of the CSI-RSs corresponding to the multiple CSI.

9. A radio communication method for a user terminal connected to transmission points supporting coordinated multi-point transmission, the radio communication method comprising the steps of:
generating multiple channel state information (CSI) using channel state information reference signals (CSI-RSs) transmitted from the transmission points;
selecting given CSI to feed back, from the multiple CSI; and
feeding back the given CSI via an uplink control channel (PUCCH), wherein
the given CSI is selected based at least on resource indices of the CSI-RSs corresponding to the multiple CSI.

10. A radio base station that is connected to a user terminal, under application of coordinated multi-point transmission, the radio base station comprising:

a generating section that generates information about a resource index of a channel state information reference signal (CSI-RS);
a transmission section that transmits, to the user terminal, the information about the resource index and the CSI-RS; and
a receiving section that receives given channel state information (CSI) fed back from the user terminal via an uplink control channel (PUCCH),
wherein the user terminal selects the given CSI from multiple CSI based on the information about the resource index and feeds back the given CSI.

11. A radio communication method for a user terminal connected to transmission points supporting coordinated multi-point transmission, the radio communication method comprising the steps of:
generating multiple channel state information (CSI) using channel state information reference signals (CSI-RSs) transmitted from the transmission points; and
feeding back the multiple CSI via an uplink shared channel (PUSCH),
wherein an order of placing the multiple CSI to the PUSCH is controlled based at least on resource indices of the CSI-RSs corresponding to the multiple CSI.

12. A radio base station that is connected to a user terminal under application of coordinated multi-point transmission, the radio base station comprising:
a generating section that generates information about a resource index of a channel state information reference signal (CSI-RS);
a transmission section that transmits, to the user terminal, the information about the resource index and the CSI-RS; and
a receiving section that receives given channel state information (CSI) fed back from the user terminal via an uplink shared channel (PUSCH),
wherein the user terminal controls an order of placing multiple CSI to the PUSCH based on the information about the resource index and feeds back the given CSI.

13. A radio communication system comprising a radio base station supporting coordinated multi-point transmission and a user terminal connected to the radio base station,
the radio base station comprising:
a transmission section that transmits, to the user terminal, a channel state information reference signal (CSI-RS) and information about a resource index; and
a receiving section that receives given channel state information (CSI) fed back from the user terminal via an uplink shared channel (PUSCH), and
the user terminal comprising:
a generating section that generates multiple CSI using CSI-RSs; and
a transmission section that feeds back the multiple CSI via the PUSCH,
wherein the transmission section of the user terminal controls an order of placing the multiple CSI to the PUSCH based at least on resource indices of the CSI-RSs corresponding to the multiple CSI.

* * * * *